(12) United States Patent
Dreisbach et al.

(10) Patent No.: US 12,449,055 B2
(45) Date of Patent: Oct. 21, 2025

(54) METHOD FOR POSITIONING A CLOSURE ELEMENT OF A VALVE OR EJECTOR, AND VALVE OR EJECTOR

(71) Applicants: Wurm GmbH & Co. KG Elektronische Systeme, Remscheid (DE); Armaturenwerk Altenburg GmbH, Altenburg (DE)

(72) Inventors: Heiko Dreisbach, Haan (DE); Lucas Mikesch, Schmölln (DE)

(73) Assignees: Wurm GmbH & Co. KG Elektronische Systeme, Remscheid (DE); Armaturenwerk Altenburg GmbH, Altenburg (DE)

( * ) Notice: Subject to any disclaimer, the term of this patent is extended or adjusted under 35 U.S.C. 154(b) by 91 days.

(21) Appl. No.: 18/243,116

(22) Filed: Sep. 7, 2023

(65) Prior Publication Data
US 2024/0084899 A1 Mar. 14, 2024

(30) Foreign Application Priority Data

Sep. 12, 2022 (DE) .......................... 102022123222.0
Oct. 7, 2022 (DE) .......................... 102022125928.5

(51) Int. Cl.
| | |
|---|---|
| *F16K 29/00* | (2006.01) |
| *F16K 1/32* | (2006.01) |
| *F16K 1/52* | (2006.01) |
| *F25B 41/20* | (2021.01) |

(52) U.S. Cl.
CPC ............... *F16K 29/00* (2013.01); *F16K 1/32* (2013.01); *F16K 1/52* (2013.01); *F25B 41/20* (2021.01)

(58) Field of Classification Search
CPC .................................. F16K 1/32; F16K 29/00
See application file for complete search history.

(56) References Cited

U.S. PATENT DOCUMENTS

| | | | |
|---|---|---|---|
| 5,518,015 A | 5/1996 | Berget et al. | |
| 5,765,591 A * | 6/1998 | Wasson ................ | F16K 27/003 137/606 |
| 5,787,924 A | 8/1998 | Cewers et al. | |
| 6,217,506 B1 | 4/2001 | Phillips et al. | |
| 6,722,625 B2 | 4/2004 | Blomberg et al. | |
| 9,995,400 B2 * | 6/2018 | Richardson ............ | F16K 1/32 |
| 10,632,489 B1 | 4/2020 | Wang | |
| 2013/0313460 A1 | 11/2013 | Kobayashi | |

(Continued)

FOREIGN PATENT DOCUMENTS

| | | |
|---|---|---|
| CN | 109506041 B | 3/2021 |
| DE | 2434810 A1 | 3/1975 |

(Continued)

*Primary Examiner* — Michael R Reid
(74) *Attorney, Agent, or Firm* — Dickinson Wright PLLC

(57) ABSTRACT

In a method for positioning a closure element of a valve or ejector, said closure element being movable by means of a drive between a first end position and a second end position, the closure element is moved into one of the first end position and the second end position and, after the closure element has been moved into the one end position, a compensation cycle is performed during which the closure element is controlled to perform a first compensation movement towards the other end position and to perform a second compensation movement towards the one end position.

17 Claims, 10 Drawing Sheets

(56) References Cited

U.S. PATENT DOCUMENTS

2019/0078703 A1 3/2019 Lee
2022/0026089 A1 1/2022 Xie

FOREIGN PATENT DOCUMENTS

| | | |
|---|---|---|
| DE | 4023636 A1 | 1/1992 |
| DE | 19516887 A1 | 11/1996 |
| DE | 19535051 C1 | 11/1996 |
| DE | 10242727 A1 | 3/2004 |
| DE | 102013209755 A1 | 11/2013 |
| DE | 112013006016 T5 | 9/2015 |
| DE | 102016123277 A1 | 6/2018 |
| DE | 102017222154 A1 | 3/2019 |
| EP | 1190656 A1 | 3/2002 |
| EP | 1664518 A1 | 6/2006 |
| EP | 1669648 A1 | 6/2006 |
| EP | 2363622 A1 | 9/2011 |
| EP | 2927535 A1 | 10/2015 |
| EP | 3387304 A1 | 10/2018 |
| WO | 2005021954 A1 | 3/2005 |
| WO | 2021119816 A1 | 6/2021 |

\* cited by examiner

METHOD FOR POSITIONING A CLOSURE ELEMENT OF A VALVE OR EJECTOR, AND VALVE OR EJECTOR

CROSS-REFERENCE TO RELATED APPLICATION

This application claims the benefit and priority of German Patent Application No. DE 102022123222.0 filed on Sep. 12, 2022 and German Patent Application No. DE 102022125928.5 filed on Oct. 7, 2022. The entire disclosure of the above applications is incorporated herein by reference.

FIELD

The invention relates to a method for positioning a closure element of a valve or ejector, the closure element being movable by means of a drive between a first end position and a second end position, wherein the closure element blocks a throughflow opening of the valve or ejector in the first end position against a throughflow of fluid or gas and releases the throughflow opening in the second end position for a throughflow of fluid or gas.

The invention further relates to a valve or an ejector.

BACKGROUND OF THE INVENTION

For example, a valve may be provided to regulate a fluid flow or gas flow. For this purpose, the valve may have at least one inlet and at least one outlet, wherein gas or fluid may flow into the valve through a throughflow opening of the inlet and flow out through a throughflow opening of the outlet when both throughflow openings are open. To be able to restrict or interrupt the throughflow, such a valve may have a closure element, wherein by moving the closure element into a first end position, which may also be referred to as the closed position, at least one throughflow opening, for example the throughflow opening of the inlet, may be closed to restrict or to interrupt the flow of the gas or fluid through the valve.

An ejector may be provided to guide and to accelerate a motive fluid (or motive gas), which flows in through a drive connector, through a drive nozzle to be able to suck in a secondary fluid (or secondary gas) through a suction connector by means of the negative pressure generated in this way and to be able to guide the secondary fluid, together with the motive fluid, out of the ejector through an outlet of the ejector. In such an ejector, a closure element may also, for example, be provided to selectively limit or close the throughflow opening for the inflowing motive fluid, wherein, by blocking the entry of the motive fluid into the ejector, the suction effect may also be prevented and an exiting of liquid or gas through the outlet of the ejector may thus be stopped.

To achieve a precise regulation of a fluid or gas flow through a valve or an ejector, it is thus necessary that the closure element, on the one hand, reliably closes the throughflow opening after moving into the first end position or the closed position and prevents unwanted leakage and, on the other hand, may be selectively and reliably moved between the end positions to selectively enable a throughflow through the valve or ejector.

However, since a throughflow of gas or fluid through the valve or ejector is prevented after the closure element has been moved into the first end position, thermal stresses may occur—for instance due to a cooling of the valve or ejector as a result of a lack of a throughflow of a warm medium or due to a heating of the valve or ejector as a result of a lack of a throughflow of a cold medium—that are reflected in deformations of the valve or ejector and in particular of a housing of the valve or ejector and that may thereby influence a closing force exerted by the closure element. Different coefficients of thermal expansion of the components installed in the valve or ejector may in particular lead to such stresses, wherein pressure differences, for example, occurring after the closing of the throughflow opening may furthermore have an effect on the closing force.

In this regard, a closing force that resulted due to the movement of the closure element into the first end position may possibly change in an unwanted manner without the closure element being controlled to make a movement, whereby a precise regulation of the throughflow and/or the operability of the valve or ejector may become more difficult. For example, contractions of a valve or ejector occurring due to thermal stresses may result in an increased force acting on the closure element and jamming the closure element so that the latter may no longer be moved into the second end position. Conversely, expansions of the valve or ejector may, for example, occur due to changing thermal conditions as a result of which a closing force exerted by the closure element may be reduced and unwanted leakage may possibly occur. Furthermore, stresses may also occur in the second end position or an open position of the closure element and lead to a jamming of the closure element so that it may no longer be moved into the first end position or the closed position in order to close the throughflow opening.

SUMMARY OF THE INVENTION

It is therefore an object of the invention to provide a method for positioning a closure element of a valve or ejector and/or a valve or an ejector, by which or in which method a reliable closing or opening of a throughflow opening of the valve or ejector, in particular also over longer time periods, and a subsequent reliable movement of the closure element into an opposite end position may be achieved.

This object is satisfied by a method having the features of claim 1. In this method, the closure element is moved into one of the end positions (first end position or second end position) and a compensation cycle is performed after the first closure element has been moved into the one end position, wherein the closure element is triggered during the compensation cycle to perform a first compensation movement towards the other end position and to perform a second compensation movement towards the one end position.

For example, the closure element may first be moved into the first end position, which may also be referred to as the closed position, to close the throughflow opening. In this regard, the first end position may represent the end position of the movement of the closure element towards the throughflow opening that may be defined in that the closure element closes the throughflow opening with a force that may be transmitted to the closure element by the drive and/or exerts the force transmittable by the drive on a seal of the throughflow opening. The closure element may therefore, for the movement into the first end position, be moved up to an abutment at which, for example, a motor shaft of an electric motor of the drive is blocked and/or an electric stepper motor of the drive suffers one or more step losses when triggering a further movement towards the throughflow opening. Conversely, the second end position, which may also be referred to as the open position, may, for example, correspond to an end position, opposite the first end position, of the movement of the closure element, in which end position the throughflow opening is released for a maximum throughflow, considering the design and dimensions of the valve or ejector.

Furthermore, the closure element may be movable into various intermediate positions that lie between the first end position and the second end position and that enable a throughflow of gas or fluid through the throughflow opening, wherein the throughflow may be increased by moving the closure element into intermediate positions that lie closer to the second end position or the open position and wherein the throughflow may be reduced by moving the closure element into intermediate positions that lie closer to the first end position or the closed position. The intermediate positions thus make it possible to be able to regulate the strength of the throughflow between a maximum throughflow reached in the second end position and a blocking of the throughflow in the first end position.

While the throughflow of gas or fluid may be reliably blocked in the first end position, the throughflow may furthermore already be blockable in some valves or ejectors by moving the closure element into a blocking position in which the closure element already closes the throughflow opening with a sufficient force to prevent a throughflow without having already reached the first end position that depends on the force transmittable by the drive. In this regard, a throughflow through the throughflow opening may generally be blocked by positioning the closure element in a blocking section that is bounded by the first end position and the blocking position that may be displaced slightly with respect to the first end position towards the second end position.

To achieve that the closure element may reliably be positioned in the end positions, but may, on the other hand, also be released from the respective end position again if required, provision is made in the method described here that, after the movement into a respective end position, the closure element does not remain unmoved in the end position, but a compensation cycle is performed. During this compensation cycle, the closure element is triggered to perform a first compensation movement towards the respective other end position and to perform a second compensation movement towards the one end position, wherein this may in particular take place by controlling the drive accordingly. During the compensation cycle, the closure element may in particular perform the first compensation movement and the second compensation movement and may be moved towards the other end position and towards the one end position. The execution of the compensation cycle may furthermore be provided during a time period during which the closure element is not controlled for a movement into the other end position or one of the aforementioned intermediate positions, but the throughflow opening is generally to remain in the one end position—the closed position or the open position.

Since the closure element is not left unmoved in the one end position, thermal stresses that are in particular built up after the reaching of the one end position may be compensated. For example, a thermal stress that leads to an increased closing force after the closure element has been moved into the first end position or the closed position may be compensated by moving the closure element towards the second end position or the open position. Due to this movement, the force exerted by the closure element on the throughflow opening or a seal of the throughflow opening may in particular be reduced so that components of the valve or ejector, in particular a housing of the valve or ejector, may so-to-say follow the movement of the closure element towards the second end position and perform a contraction to reduce the thermal stresses. By moving the closure element towards the first end position again, it may be ensured that the throughflow opening is again closed reliably and, for example, with a predefined closing force. However, an absolute position of the first end position may possibly have shifted due to the contraction of the valve or ejector so that the triggered movement towards the first end position is possibly not completely performed, but the (shifted) first end position is already reached beforehand.

Furthermore, thermally induced reductions in the closing force exerted by the closure element may also be compensated by the procedure explained in case the lack of mass flow due to the closure element being in the first end position leads to an expansion of the valve or ejector. This may in particular be the case if the lack of a throughflow of a cold medium leads to a heating of the valve or ejector.

As a result of such an expansion, the throughflow opening may possibly move slightly away from the closure element so that the closing force exerted by the closure element is reduced without the closure element having been controlled for a movement out of the first end position or the closed position. However, such thermal changes may be compensated by moving the closure element towards the first end position during the compensation cycle in that the closure element may so-to-say track the expansion of the valve or ejector. Unwanted leakage may thereby in particular be prevented.

To achieve that both thermally induced contractions and thermally induced expansions of the valve or ejector may be compensated, provision may in particular be made that the closure element is triggered to move by a larger distance towards the first end position than towards the second end position so that the closure element may ultimately follow a possible expansion of the valve or ejector in the course of the compensation cycle and compensate this expansion. If, on the other hand, the valve or the ejector experienced a contraction, this contraction may be compensated by the movement towards the second end position, whereupon at least a part of the triggered distance towards the first end position or a part of the second compensation movement cannot be performed and the first end position that was shifted due to the contraction may already be reached before completing the second compensation movement. For example, a stepper motor of the drive may therefore suffer one or more step losses as a result of the triggered second compensation movement. In this case, a closing force, however, also results that is determined and therefore defined by the force that may be transmitted to the closure element by the drive during the movement towards the first end position. This will be explained in more detail below.

Whereas, in particular, a compensation of thermal stresses and a prevention of a leakage due to expansions of the valve or ejector after moving the closure element into the first end position or the closed position were explained above, the execution of the compensation cycle may also be provided after reaching the second end position or the open position. Stresses may in particular also build up after reaching the second end position and may possibly result in a jamming of the closure element. However, such stresses may be released by performing the compensation cycle and in particular by moving towards the first end position or towards the closed position to be able to position the closure element in the second end position again by a subsequent movement towards the second end position. If, furthermore, during the compensation cycle, a larger movement towards the second end position than away from the second end position is triggered, a possible incorrect positioning of the closure element may additionally be compensated by performing the compensation cycle in case the closure element was not originally completely positioned in the second end position or the open position, for example due to step losses. The compensation cycle may therefore also serve to compensate a possible original incorrect positioning after the movement into the one end position and to move the closure element further towards the respective targeted first or second end position.

Furthermore, provision may be made to repeat the compensation cycle cyclically if the closure element is not moved out of the one end position to also be able to compensate, for example, thermal stresses that built up after a first compensation cycle.

Provision may generally be made to move the closure element into the one end position by the second compensation movement so that the closure element may be triggered to perform a compensation movement into the one end position. However, it is possible that before the compensation cycle is performed, an expansion occurs that cannot be fully compensated by the triggered second compensation movement towards the one end position, for example a movement along a predefined distance, so that the one end position is not fully reached. However, such expansions may also in particular be fully compensated by cyclically repeating the compensation cycle.

Furthermore, the drive may, in particular, be controlled to move the closure element only slightly towards the other end position, in particular only slightly towards the second end position, after the closure element has been moved into the first end position or the closed position. Therefore, after moving into the first end position, the closure element may be moved by the first compensation movement towards the second end position, in particular not up to and into the second end position and/or not up to and into one of the above-mentioned intermediate positions, but for example only so far towards the second end position that the throughflow opening continues to be blocked and no leakage occurs. In this regard, after moving into the first end position, the closure element may, by the movement towards the second end position, only be moved between the first end position and the aforementioned blocking position and/or in a blocking section of the valve or ejector. After the closure element has been moved into the second end position, the closure element may also be moved only slightly towards the first end position during the compensation cycle so that the compensation cycle is not accompanied by an unwanted or relevant interruption of the throughflow through the throughflow opening. However, the closure element may, by moving towards the one end position, generally be moved up to and into the one end position.

A valve may have at least one inlet having a throughflow opening and one outlet having a throughflow opening, wherein an inlet flow entering through the inlet and an outlet flow exiting through the outlet may be regulable by means of the closure element. For example, the closure element may be provided to selectively block the throughflow opening of the inlet or to release it for a throughflow that then leaves the valve as an outlet flow through the outlet and its throughflow opening. However, it is also possible to selectively close or release a throughflow opening of an outlet of a valve by means of a closure element.

An ejector may have a drive connector which has a throughflow opening and through which a motive fluid (or motive gas) enters that is guided through a drive nozzle. Due to the negative pressure that is thereby generated, a secondary fluid (or secondary gas) may be sucked in through a suction connector, for which purpose an ejector may have a further throughflow opening. A mixture of the motive fluid (or motive gas) and the sucked-in secondary fluid (or secondary gas) may be guided through an outlet of the ejector having a further throughflow opening so that the ejector may in particular have at least three throughflow openings. For example, provision may be made to be able to selectively close the throughflow opening associated with the drive connector by means of a closure element to be able to prevent both the throughflow of motive fluid (or motive gas) through the ejector and the suction effect. An ejector may generally also be called a jet pump.

Further embodiments of the invention can be seen from the dependent claims, from the description and from the drawings.

In some embodiments, provision may be made that the compensation cycle is performed after a predefined or predefinable waiting time after the reaching of the one end position. In this regard, in some embodiments, the closure element may remain unmoved for a predefined or predefinable waiting time after reaching the one end position in order to perform the compensation cycle after the waiting time has elapsed and in particular to be able to release thermal stresses built up during the waiting time.

However, in some embodiments, it is also possible for at least a first compensation cycle to be performed directly after the reaching of the one end position. After the first compensation cycle, the closure element may, for example, remain unmoved for the waiting time mentioned in order to perform a further compensation cycle after the waiting time has elapsed.

Furthermore, in some embodiments, the compensation cycle may be cyclically repeated, wherein a cycle time of the cyclic repetition may in particular correspond to the waiting time mentioned so that a further compensation cycle may be performed after the termination of a respective compensation cycle, provided that the closure element is not controlled for a movement out of the one end position during the waiting time after the termination of the previous compensation cycle.

However, in some embodiments, provision may be made that at most a predefined maximum number of compensation cycles is performed and, after the maximum number of compensation cycles has been reached, no further compensation cycle is performed as long as the closure element is not moved out of the one end position and is then moved into one of the first end position and the second end position again. Furthermore, in some embodiments, provision may be made that the closure element is permanently triggered to perform compensation movements after reaching the one end position as long as the closure element is not controlled for a movement out of the one end position or into the other end position or one of the intermediate positions mentioned so that, in some embodiments, a further compensation cycle may be started immediately after the termination of a compensation cycle.

In some embodiments, the closure element may be movable in a translatory manner between the first end position and the second end position. For example, the closure element may be provided to be moved into a valve seat of a seated valve in order to close a throughflow opening formed at the valve seat. Translatory expansions and/or contractions of the valve or ejector along a direction of movement of the closure element may thus in particular be compensated by the compensation cycle.

To be able to move the closure element in a translatory manner between the first end position and the second end position, the drive may comprise a spindle drive, for example. Such a spindle drive may generally comprise a spindle having an external thread (e.g. a threaded rod) and a spindle nut that has an internal thread and that is in threaded engagement with the spindle. Due to a rotary drive of the one element, the other element that is rotationally fixedly but axially displaceably supported is driven in the axial direction, wherein a considerable slowing down may be brought about. The closure element may, for example, be connected to a (in particular rotationally fixedly held) spindle of such a spindle drive. Alternatively thereto, the closure element may be connected to a (in particular rotationally fixedly held) spindle nut of such a spindle drive. The drive of the closure element may further in particular comprise a stepper motor so that the drive may, for instance, be controlled to perform a respective number of steps of the stepper motor in order to move the closure element.

In some embodiments, the closure element may first be triggered to perform the first compensation movement and may then be triggered to perform the second compensation movement, or vice versa. In this regard, during the compensation cycle, the closure element may first be triggered to move away from the one end position in which the closure element was positioned and may then be triggered to move back towards the one end position, or the closure element may first be triggered to move towards the one end position and may then be triggered to move away from the one end position.

Provision may generally be made to move the closure element towards the one end position at the end of the compensation cycle, i.e. to first trigger the first compensation movement and then the second compensation movement. Due to this order of the compensation movements, it may be achieved that the closure element may be positioned in the one end position after the compensation cycle and/or may be positioned further towards the one end position by performing the compensation cycle than before triggering the compensation cycle.

Alternatively thereto, the closure element may, however, also first be triggered to perform the second compensation movement and may then be triggered to perform the first compensation movement so that the closure element may be positioned away from the one end position towards the other end position at the end of the compensation cycle. This may be in particular be provided if the first compensation movement directed away from the one end position is so small that the opening state of the throughflow opening thereby ultimately does not change. If the closure element is thus first positioned in the first end position or the closed position and such a compensation cycle is thereupon performed, the closure element may, through the second compensation movement, first track a possible expansion of the valve in order to reduce any stresses through the subsequent first compensation movement. If the first compensation movement is sufficiently small such that the closure element is not guided out of the blocking section already mentioned, a leakage after the execution of the compensation cycle may be prevented despite the positioning of the closure element away from the first end position.

In some embodiments, the closure element may be triggered to perform the first compensation movement along a first distance and to perform the second compensation movement along a second distance, wherein the second distance may be greater than the first distance.

As already explained above, in particular, both thermally induced contractions and thermally induced expansions of the valve or ejector may be compensated by this approach in that the closure element, in particular after moving into the first end position or the closed position, enables a contraction by means of the first compensation movement, but may so-to-say track a possible expansion due to the larger movement towards the first end position in the course of the second compensation movement. Due to the first compensation movement and the in particular subsequent second compensation movement, expansions that are less than or equal to the difference between the second distance and the first distance may thereby be compensated. During a corresponding expansion of the valve or ejector before the execution of the compensation cycle, the closure element may in particular be moved by the first distance towards the second end position and by the second distance towards the first end position.

If, however, an expansion of the valve or ejector, in particular, of a housing of the valve or ejector, that took place before performing the compensation cycle is less than the difference between the second distance and the first distance or if the valve or ejector experiences a contraction, provision may be made that the drive is indeed triggered to move the closure element by the second distance, but the closure element does not perform this movement completely. The closure element may in particular already close the throughflow opening with a closing force, which may be transmitted to the closure element by the drive and which is therefore defined, before the second distance towards the first end position is completely covered so that the first end position is reached and the closure element cannot be moved further towards the throughflow opening. In such a case, the movement of the closure element is therefore aborted by abutting the passage opening so that, for example, step losses of a stepper motor driving the closure element may occur. Similarly, in the case of a second compensation movement directed towards the second end position, the closure element may already reach the second end position before covering the second distance, for instance, if the closure element was in the second end position before the triggering of the first compensation movement. If the valve or the ejector experiences a contraction that at least corresponds to the first distance, the closure element may furthermore, due to this contraction, possibly ultimately remain in the one end position even despite the first compensation movement so that the closure element remains unmoved during the subsequent control of the drive to move the closure element towards the first end position.

Furthermore, a possible incorrect positioning of the closure element may also be compensated by such a proportion between the first and the second distance if the closure element was not originally moved up to and into a mechanical end position. In particular, the closure element may therefore be moved further towards the second end position and/or the first end position by performing the compensation cycle if the respective end position was not originally reached, for example, due to unconsidered step losses of a stepper motor.

The control explained for moving the closure element by a first distance towards the other end position and by a second distance towards the one end position thus enables a compensation of both thermally induced contractions and thermally induced expansions. If the valve or the ejector furthermore experiences an expansion that is greater than the difference between the first distance and the second distance, such expansions may also be completely compensated by cyclically repeating the compensation cycle, wherein, due to the successive tracking by the closure element after moving into the first end position, it may furthermore at least be prevented that the closure element removes itself from the blocking section mentioned and a leakage occurs.

In some embodiments, the closure element may be movable in a stepwise manner and may be triggered to perform the first compensation movement with a first number of steps and to perform the second compensation movement with a second number of steps, wherein the second number of steps may be greater than the first number of steps. To be able to perform such a control, the drive may in particular comprise a stepper motor.

The second number of steps may in particular be greater than the first number of steps by at least one step. The control of the drive to move the closure element by a first number of steps towards the other end position and by a second number of steps towards the one end position again enables the drive to move the closure element by different distances and to compensate both contractions and expansions of the valve or ejector. In particular, all the steps of the second number of steps may therefore be performed if, before the execution of the compensation cycle, the valve or the ejector experiences an expansion or has not originally reached the one end position, whereas step losses may occur or steps may at least not be fully performed if the valve or the ejector experiences a contraction or only experiences an expansion that is less than the distance of the closure element to be covered by one step. However, in some embodiments, the first number of steps may always be performed and/or the aforementioned first distance may always be covered.

The second number of steps may be greater than the first number of steps by exactly one step in some embodiments. For example, provision may be made to control the drive to move the closure element by two steps towards the other end position and by three steps towards the one end position. However, in other embodiments, provision may also be made that the second number of steps is greater than the first number of steps by exactly two, exactly three, exactly four, or exactly five steps. A larger difference between the second number of steps and the first number of steps may in particular be provided if relatively large expansions of the valve or ejector are to be expected due to the application or design or if the compensation cycle is only performed after a waiting time after reaching the one end position so that relatively large expansions may develop. With longer waiting times and/or expected larger contractions, the number of steps towards the other end position may furthermore also be increased, for example, to three steps, four steps, or five steps.

In some embodiments, the closure element may be triggered to move by less than 50 µm, in particular by less than 20 µm, towards the other end position in order to perform the first compensation movement. For example, the closure element may be moved by approximately 15 µm towards the other end position. Due to such a slight movement, it may be achieved, in particular after moving the closure element into the first end position or the closed position, that the closure element, despite the movement towards the second end position or the open position, exerts a closing force that prevents a throughflow of fluid or gas through the throughflow opening so that the execution of the compensation cycle does not result in a leakage through the throughflow opening. Rather, the throughflow opening may remain reliably closed and the compensation movements only serve to compensate and/or reduce thermal stresses and/or to correct a possible incorrect positioning.

In some embodiments in which the closure element is movable in a stepwise manner, the closure element may be movable by less than 20 µm by one step. The closure element may in particular be movable by less than 15 µm and/or by less than 10 µm by one step. Furthermore, in some embodiments, the closure element may be movable by approximately 7 µm by one step. In this regard, in such embodiments, the closure element may be moved precisely in a stepwise manner by only such small distances that the closure element in particular does not have to be moved out of a blocking section of the valve or ejector during a movement starting from the first end position towards the second end position, but the throughflow opening remains reliably closed despite the movement of the closure element.

In some embodiments, the triggered first compensation movement may be compensated by an elastic deformation of an elastically deformable compensation element that is arranged in a force transmission path from a housing of the valve or the ejector to the closure element. In such embodiments, the compensation element may be elastically deformed in particular due to a movement of the closure element into the one end position and the force that is exerted on the closure element by an abutment of a housing of the valve or ejector, for example a boundary of the throughflow opening, and transmitted to the compensation element. If the closure element is then triggered during the compensation cycle to perform the first compensation movement towards the other end position, the force exerted by the abutment on the closure element and transmitted to the compensation movement is reduced so that the compensation element may unfold against the previously experienced elastic deformation and may thereby compensate the first compensation movement.

The force transmission path may generally result from the closure element being supported directly or indirectly at a housing of the valve or ejector so that a closing force may be established. For example, the closure element may be supported at the housing of the valve or the ejector via a part of a spindle drive and/or via a bearing (in particular a rolling element bearing). The compensation element may variably absorb any play intentionally present in the force transmission path.

Thus, in such embodiments, a closing force exerted by the closure element may indeed be reduced by the first compensation movement and thermal stresses may be reduced, but the closure element ultimately remains unmoved in the position previously taken. Therefore, in such embodiments, the closure element in particular cannot cover a triggered first distance for performing the first compensation movement due to the compensation by the compensation element.

Provision may, in particular, be made that the closure element is preloaded towards the first end position or the closed position by the compensation element. If, in such embodiments, the closure element, after moving into the first end position, is triggered during the compensation cycle to perform the first compensation movement, and thus a movement towards the second end position, this movement may, as explained above, be compensated by an unfolding of the compensation element and a reduction of the preload developed by the compensation element so that a closing force exerted by the closure element may indeed be reduced but a position of the closure element may remain unchanged. For example, the closure element may for this purpose be supported at the housing via a compensation element configured as a preloaded spring, for example a plate spring, wherein the spring may expand as a result of the reduction in the closing force due to the triggered first compensation movement and may thereby compensate the first compensation movement. By means of such a compensation element, a force exerted by the closure element after moving into the first end position may thus be reduced as a result of the triggering of the first compensation movement in order thereby to be able to reduce any built-up stresses and prevent the closure element from jamming, but without the closure element being moved away from the throughflow opening. In this regard, a leakage as a result of the first compensation movement may in particular be reliably prevented.

Furthermore, due to such a compensation element—as an alternative or in addition to the technical control compensation of thermal contractions or expansions of the valve or ejector—a mechanical compensation of such expansions or contractions may also be achieved, as will be explained in more detail below.

In some embodiments, the compensation cycle may be performed after a predefined or predefinable waiting time after the reaching of the one end position. Provision may thus be made that, after reaching the one end position, the closure element remains unmoved for a waiting time before the compensation cycle is performed after the waiting time has elapsed in order to be able to reduce thermal stresses in particular built up during the waiting time. The waiting time may, for example, be stored in a control for the drive of the closure element and/or may be selectively settable by a user of the valve in such a control. The waiting time may in particular be selected such that, on the one hand, a jamming of the closure element and/or an unwanted leakage may be prevented, but, on the other hand, movements of the closure element and the associated loads on the components of the valve or ejector may be minimized. In this regard, the waiting time may depend on the design and/or application of the valve or ejector, in particular on the thermal conditions to be expected, a temperature of the medium flowing through and/or the materials of the valve or the ejector. In general, the waiting time may, however, also be calculated and thereby predefined by a control for the drive of the closure element.

The waiting time may be less than 120 seconds in some embodiments. The waiting time may in particular be less than 60 seconds and/or less than 30 seconds. Furthermore, in some embodiments, the waiting time may be approximately 10 seconds, in particular between 9 seconds and 11 seconds and/or exactly 10 seconds. The waiting time may in particular be selected in dependence on the respective application and/or the respective design of the valve or the ejector, for example the materials used. In general, shorter waiting times may, for example, be provided if—for instance when using very cold or very hot fluids or gases—relatively high thermal stresses are to be expected in a short time. In some embodiments, provision may, however, also be made that the waiting time is less than 500 seconds or equals 500 seconds.

In some embodiments, a first compensation cycle may further be performed directly after the reaching of the one end position. In such embodiments, the closure element may thus be triggered to perform the two compensation movements directly after reaching the one end position. After the first compensation cycle has been performed, the compensation cycle may, for example, be cyclically repeated with the predefined or predefinable waiting time as the cycle time, for example a waiting time of 10 seconds, provided that the closure element is not moved out of the respective end position. Furthermore, provision may also be made to perform the first compensation movement and the second compensation movement permanently in succession as long as the closure element is not controlled for a movement out of the one end position so that, for instance, the first compensation cycle may be immediately followed by a further compensation cycle without the closure element remaining unmoved between the compensation cycles for a waiting time.

In some embodiments, the closure element may be moved into the first end position and the compensation cycle may be performed after the closure element has been moved into the first end position. A jamming of the closure element in the first end position or the closed position due to thermal stresses and/or a leakage due to an expansion of the valve or ejector may in particular be prevented by this execution of the compensation cycle.

In some embodiments, the throughflow opening may be closed with a first closing force by moving the closure element into the first end position.

The first closing force may, in particular, be predefined or predefinable and may, for example, be defined by the force that may be transmitted to the closure element by the drive. This force may, for example, be determined by a motor current or a motor torque of a motor of the drive, wherein the motor current or the motor torque may be settable if necessary. In this regard, the first closing force may correspond to the force that is transmitted to the closure element during the movement of the closure element into the first end position and/or that is set for this purpose. For example, the closure element may apply the first closing force to a seal of the throughflow opening.

The first end position may thus generally be defined by the reaching of the closing force, wherein the absolute position of the first end position may, however, depend on the state of the valve or ejector. An absolute position of the first end position may in particular shift due to expansions or contractions of the valve or ejector since the closure element may, for example due to an expansion of the valve or ejector, be moved by a larger distance, starting from the second end position, towards the throughflow opening before the closure element closes the throughflow opening with the force that may be transmitted by the drive.

In some embodiments, the first closing force may correspond to a force that may be transmitted to the closure element by the drive, in particular to a force that may be transmitted and/or is transmitted during the movement into the first end position.

In some embodiments, the throughflow opening may be closed with a second closing force by performing the second compensation movement, wherein the second closing force may be smaller than the first closing force.

The second closing force may, for example, also be predefined or predefinable and may in particular correspond to a force that may be transmitted and/or is transmitted to the closure element by the drive during the second compensation movement. In this regard, provision may, for example, be made that a motor current of a motor of the drive is reduced during a movement of the closure element towards the first end position in the course of the compensation cycle compared to the previous movement of the closure element into the first end position. For example, the motor current applied during the movement of the closure element towards the first end position may correspond to 80% of the motor current that is applied to move the closure element into the first end position. A second closing force defined in this way may in particular be set when the closure element reaches the first end position due to the triggered second compensation movement.

By reducing the closing force, the load on the components due to the execution of the compensation cycle may in particular be reduced to minimize a possible increase in the load—in particular in the case of a cyclic repetition of the compensation cycle with a short cycle time between consecutive compensation cycles—compared to leaving the closure element in the first end position. Furthermore, by setting a reduced second closing force, the throughflow opening may be closed with a better defined force in that the closure element may so-to-say be moved more gently onto a seal of the throughflow opening and force peaks or force losses due to an abutting of the closure element with a high force may be avoided.

In some embodiments, the drive may be controlled to drive the closure element with a smaller force during the second compensation movement than during the movement into the one end position. In this regard, the drive may in some embodiments be controlled to move the closure element with a smaller force towards the one end position than into the one end position. For example, a motor current of a motor of the drive for moving the closure element towards the one end position—i.e. during the second compensation movement—may for this purpose be reduced compared to a setting for moving the closure element into the one end position—which may in particular define the first closing force mentioned. If the closure element in such embodiments, for example due to the triggered second compensation movement, thus reaches the first end position again in which the closure element closes the throughflow opening with the force that may be transmitted by the drive during the movement towards the first end position, the throughflow opening may be closed with a force that is reduced compared to the first closing force, but is more clearly defined and less stressful. In this regard, in some embodiments, the closure element may be moved with a reduced force during the second compensation movement compared to the first closing force.

The force that may be transmitted to the closure element by the drive may be settable in some embodiments, in particular by setting an electric motor current of a motor of the drive.

In some embodiments, the force transmitted to the closure element by the drive during the movement into the one end position may be reduced before an expected reaching of the one end position.

In order, for example, to ensure that the first end position is reliably reached, provision may be made when driving the closure element by means of a stepper motor to set a number of steps at which the closure element would travel beyond the expected position of the first end position so that step losses of the stepper motor after reaching the first end position are accepted. A similar approach may also be provided for moving the closure element into the second end position or the open position. When using a stepper motor, the motor current may therefore be reduced in such embodiments even before the expected reaching of the respective end position, for example approximately ten steps before reaching the expected end position, in order to reduce the force with which the closure element strikes when reaching the respective end position and, for example, to achieve an as smooth as possible impact of the closure element on a seal of the throughflow opening.

For example, the force transmitted to the closure element by the drive may be reduced before an expected reaching of the one end position to the force with which the closure element is moved towards the one end position during the compensation cycle. In this regard, the transmitted force may in particular be reduced to the aforementioned second closing force during the movement into the first end position. The force reduction may in particular take place by reducing a motor current of a motor of the drive so that the motor current may, for example, be reduced to 80% of the original motor current before reaching the end position.

In contrast to moving the closure element into the one end position to which the drive may thus in particular be overdriven, the movement towards the one end position may take place during the compensation cycle by controlling a movement by a defined distance and/or a defined number of steps. Therefore, the one end position may be reached by the movement towards the one end position only when the spacing of the closure element from the one end position is smaller after the movement towards the other end position and/or before the execution of the second compensation movement than the predefined distance and/or number of steps. A force-controlled movement towards the one end position during which the closure element may always be moved up to and into the one end position is, however, generally also conceivable.

In some embodiments, the throughflow of the fluid or gas through the throughflow opening may be blockable by moving the closure element into a blocking section of the valve or ejector, said blocking section being bounded by the first end position and a blocking position displaced with respect to the first end position towards the second end position, and the closure element may—after moving into the first end position—be moved only within the blocking section by the first compensation movement. In this regard, in such embodiments, the closure element may, by moving towards the second end position, be moved between the first end position and the blocking position and not out of the blocking section so that the throughflow through the throughflow opening remains blocked despite the movement of the closure element towards the second end position.

In general, the movement of the closure element toward the second end position—after a movement into the first end position—may thus not result in a throughflow of gas or fluid through the throughflow opening and/or the valve or the ejector.

The blocking position may generally be defined relative to the first end position, wherein an absolute position of the first end position may again depend on external conditions and, for example, an expansion of the valve or ejector. For example, the blocking position may be defined by a number of steps of a closure element movable in a stepwise manner, starting from the first end position, towards the second end position, wherein the closure element may be moved only by this number of steps or a smaller number of steps towards the second end position or the drive may be controlled to move the closure element by such a number of steps. If the position of the first end position changes due to expansions or contractions of the valve or ejector and if this change is compensated by performing the compensation cycle, the blocking position also changes accordingly so that, starting from the new first end position, it may be ensured by a movement towards the second end position by the unchanged number of steps and/or distance that the throughflow opening does not open.

In some embodiments, the drive may be controlled to drive the closure element with a larger force during the first compensation movement than during the second compensation movement and/or than during the movement into the one end position. In this regard, in some embodiments, the drive may be controlled to move the closure element with a larger force towards the other end position than towards the one end position and/or, in some embodiments, the drive may be controlled to move the closure element with a larger force towards the other end position than into the one end position.

Due to this increase in the force compared to the driving during the second compensation movement and/or during the movement into the one end position, it may be achieved that the closure element may move towards the other end position despite thermal stresses or forces that build up before performing the compensation cycle and that may lead to an increase in the force acting on the closure element and/or to a jamming of the closure element, and that these thermal stresses or forces may be compensated. For example, a motor current may for this purpose be increased compared to the movement of the closure element into the one end position or towards the one end position.

Furthermore, in some embodiments, provision may be made that the closure element is moved into the other end position and/or an intermediate position, wherein the drive may be controlled to move the closure element into the other end position and/or the intermediate position with an increased force compared to the movement of the closure element into the one end position and/or compared to the second compensation movement. Any stresses may thus be reliably overcome even when moving the closure element into the other end position. In particular, the motor current may in this respect be increased at the start of the movement into the other end position and/or an intermediate position in order to then reduce the motor current again and to complete the movement, for example, with the force with which the closure element was moved into the one end position.

In some embodiments, the compensation cycle may be cyclically repeated. The compensation cycle may in particular be cyclically repeated as long as the closure element is not moved into the other end position or into one of the intermediate positions mentioned in order to deliberately change a throughflow through the throughflow openings. The cyclic control may therefore be performed as long as the throughflow opening is closed or should remain closed after the movement into the first end position or as long as the throughflow opening is released or should remain released after the movement into the second end position.

Furthermore, in some embodiments, a cycle time between two consecutive executions of the compensation cycle may be constant or increase successively. In some embodiments, the cycle time may in particular correspond to the waiting time already mentioned.

For example, provision may be made to cyclically control the drive to perform the compensation cycle after the closure element has been moved into the first end position or the second end position. If a constant waiting time of 10 seconds is selected, provision may, for example, be made that the drive is controlled 10 seconds after the reaching of the one end position to perform the compensation cycle in order to be controlled to perform the compensation cycle again 10 seconds after completion of the compensation cycle. In some embodiments, compensation cycles may, however, also be performed continuously so that once a compensation cycle is completed, a further compensation cycle may be started immediately as long as the closure element is not controlled for a movement out of the one end position or for a movement into the other end position or into one of the intermediate positions mentioned.

Alternatively to a constant cycle time, provision may, however, also be made that the time between respective compensation cycles, and thus the cycle time, increases successively with each cycle or after a predefined number of compensation cycles, for example with every second or third cycle, so that said movements may increasingly be performed less frequently. Due to this successive extension of the cycle time, the load on the components of the valve or the ejector, said load being associated with the movements of the closure element, may be minimized and the effect may be accounted for that the valve or the ejector anyway increasingly approaches a thermal equilibrium as the duration for which the closure element remains in the one end position increases such that possible thermal stresses build up more slowly. This may in particular be considered regarding the approach of a thermal equilibrium with increasing duration of the throughflow through the throughflow opening being interrupted. Therefore, such thermal stresses may also be compensated as cycle times lengthen.

In some embodiments, the cyclic repetition of the compensation cycle may be terminated after a predefined or predefinable maximum number of compensation cycles has been performed. In particular, a predefined or predefinable maximum number of compensation cycles may thus be performed, wherein after the maximum number of compensation cycles has been performed, a further compensation cycle may only be performed after a movement of the closure element out of the one end position and after a further movement of the closure element into one of the first end position and the second end position. For example, provision may be made to perform a maximum of five or a maximum of ten compensation cycles.

For example, such a maximum number of compensation cycles may be stored in a control and/or may be predefinable by an operator of the valve or ejector for this purpose. Due to such a termination of the cyclic repetition of compensation cycles, unnecessary movements of the closure element that lead to loads on the components of the valve or the ejector may in particular be avoided if the closure element remains in the adopted end position for a longer time period and therefore, in view of the increasing approximation of thermal equilibrium, no greater thermal expansions or contractions of the valve or ejector are to be expected any longer.

The invention further relates to a valve or an ejector that comprises a closure element that is movable between a first end position and a second end position, wherein the closure element is configured to block a throughflow opening of the valve or ejector in the first end position against a throughflow of fluid or gas and to release the throughflow opening in the second end position for a throughflow of fluid or gas. The valve or the ejector furthermore comprises an elastically deformable compensation element that is arranged in a force transmission path from a housing of the valve or ejector to the closure element. In particular, the valve or the ejector may further comprise a drive for moving the closure element.

The elastically deformable compensation element may generally be designed and arranged as explained above.

Such an elastically deformable compensation element arranged in a force transmission path from a housing of the valve or ejector, which housing may also be referred to as a shell, to the closure element may in particular make it possible to absorb, by way of an elastic deformation, changes in a force transmitted from the housing to the closure element that, for example, occur due to thermally induced contractions or expansions of the housing, and thereby to achieve a mechanical compensation of such expansions and/or contractions.

For example, the compensation element may be configured to exert a preload directed away from the second end position (or open position) on the closure element when the closure element has been moved into the first end position (or closed position). The compensation element may in particular be elastically deformed in this respect when the closure element is positioned in the first end position so that the compensation element may exert a force directed opposite to this elastic deformation on the closure element and may thereby preload the closure element further towards the throughflow opening. If the housing of the valve or the ejector then expands, the force exerted by the housing on the closure element, for example via a boundary of the throughflow opening, is reduced so that the force transmitted to the compensation element may accordingly also be reduced and the compensation element may unfold against the previously experienced elastic deformation. Due to this unfolding or deformation of the compensation element, the closure element may track the expansion of the housing and in particular of the throughflow opening that is moving away due to this expansion so that the throughflow opening may nevertheless remain reliably closed against a leakage. In this regard, such an expansion may indeed result in a reduction of a closing force that ultimately corresponds to the preload on the closure element, said preload being reduced due to the unfolding of the compensation element, but a change in position of the closure element relative to the throughflow opening as a result of an expansion of the housing of the valve or ejector and a leakage caused thereby may be prevented.

In the reverse case of a contraction of the housing of the valve or ejector in a situation in which the closure element is in the first end position, a force exerted by the housing on the closure element towards the second end position may increase, whereby the closure element could in principle jam. However, since the elastically deformable compensation element is arranged in the force transmission path from the housing to the closure element, this increased force may be absorbed by an elastic deformation of the compensation element so that the closure element may so-to-say elude the contraction and a jamming of the closure element may be prevented.

In a corresponding manner, expansions or contractions in the second end position may generally also be compensated in that the compensation element may, for example, be elastically deformed when the closure element is positioned in the second end position in order thereby to develop a preload directed away from the first end position on the closure element.

An underlying object of the invention of providing a valve or an ejector in which a reliable closing or opening of a throughflow opening of the valve or ejector, in particular also over longer time periods, and a subsequent reliable movement of the closure element into an opposite end position may be achieved, may thus also be satisfied by such a mechanical compensation of forces transmitted from the housing to the closure element through thermal stresses in that, on the one hand, a reliable positioning of the closure element in the end positions may also be achieved in the event of possible expansions of the housing and, on the other hand, a jamming of the closure element may be prevented in the event of a contraction of the housing. Such a mechanical compensation may in particular be provided as an alternative or in addition to the positioning method explained above in order to satisfy the underlying object of the invention.

The compensation element may, for example, be a spring. However, it is also possible for the closure element to have an elastically deformable section, for instance a section made of a rubber or plastic, that forms the compensation element and/or for such a section to be provided at a component of the valve or ejector that is located in the force transmission path from the housing to the closure element. Furthermore, the compensation element may in particular be elastically deformable along a direction of movement of the closure element to be able to mechanically compensate expansions and/or contractions of the housing of the valve or ejector with respect to this direction of movement through elastic deformation of the compensation element.

In some embodiments, the closure element may be supported at the housing via the compensation element. The closure element may in particular be supported at the housing directly or indirectly via the compensation element. For example, the compensation element may be arranged directly at a housing section of the housing so that the closure element may be supported at the housing directly via the compensation element. However, it is, for example, also possible for the compensation element to be supported at a component of a drive of the closure element that is immovable relative to the housing, for example at a motor fastened to the housing, so that the closure element may be supported at the housing indirectly via the compensation element and the component of the drive. However, irrespective of a direct or indirect support, such a support of the closure element via an elastically deformable compensation element makes it possible to move the closure element as a result of a change in a force exerted on the closure element, while bypassing the drive, relative to the support and thus relative to the housing through elastic deformation of the compensation element in order to be able to compensate such changes in force. In particular, changes in force due to thermally induced changes in length of the housing may therefore be compensated when the closure element is in one of the end positions and in particular the first end position.

The closure element may be movable in a translatory manner between the first end position and the second end position in some embodiments. In such embodiments, the compensation element may in particular be axially elastically deformable with respect to the translatory movement of the closure element.

The closure element may be preloaded towards the first end position by the compensation element in some embodiments. In particular, in some embodiments, the closure element may be preloaded by the compensation element in a direction of a movement directed away from the second end position when the closure element is positioned in the first end position. As already explained, due to such a preload, in particular expansions and/or contractions of the valve or ejector may be compensated when the closure element is positioned in the first end position and a flow of fluid or gas through the throughflow opening is thereby blocked.

Furthermore, in some embodiments, the compensation element may be configured to be elastically deformed as a result of movement of the closure element into the first end position. For example, as a result of the movement of the closure element into the first end position and an abutting of the closure element at an abutment of the housing, for example a boundary and/or a seal of the throughflow opening, a force may be transmitted via the closure element to the compensation element by which the compensation element may be elastically deformed. The compensation element may thus in particular be elastically deformed when the closure element is positioned in the first end position. Due to this elastic deformation, the compensation element may exert a preload on the closure element, which preload is directed away from the second end position and towards the throughflow opening. If the valve or the ejector then experiences an expansion, the force exerted by the abutment on the closure element and transmitted to the compensation element is reduced so that the compensation element may perform a deformation directed opposite to the deformation generated by the movement of the closure element into the first end position and the closure element may thereby track the expansion of the valve or ejector. In particular, an elasticity of the compensation element may thus be matched to a force transmitted to the closure element by a drive for the closure element during the movement into the first end position such that the compensation element may be elastically deformed by the force transmitted by the drive.

For example, provision may be made that a spring arranged in the force transmission path from the housing to the closure element is compressed as a result of a movement of the closure element into the first end position so that the closure element may track a possible expansion of the valve or ejector by unfolding the spring.

The compensation element may, in some embodiments, be elastically deformable by a force exerted on the closure element and directed towards the second end position when the closure element is positioned in the first end position. In particular, the compensation element may thus be configured to absorb, by way of elastic deformation, larger forces than a force transmitted to the closure element by the drive during the movement of the closure element into the first end position or a closing force developed by the closure element in the first end position. The compensation element may therefore, for example, absorb a force exerted on the closure element due to a contraction of the housing of the valve or ejector by means of an elastic deformation, in particular a further elastic deformation, so that the closure element may so-to-say avoid the contraction or be carried along with the contraction of the housing. Such a configuration of the compensation element may thus in particular prevent a jamming of the closure element due to contractions of the housing when the closure element is positioned in the first end position. To be able to be elastically deformed by a force exerted on the closure element and directed towards the second end position when the closure element is positioned in the first end position, the compensation element may in particular not already be completely elastically deformed by the movement of the closure element into the first end position. For example, windings of a compensation element that is configured as a spring and that is already compressed by the movement of the closure element into the first end position therefore cannot come into contact with one another due to this movement of the closure element so that a further compression of the spring is possible in the event of a contraction of the housing.

In some embodiments, the compensation element may be arranged at the closure element or at a connection section that is movable in a translatory manner together with the closure element. For example, such a compensation element may be formed by an elastically deformable section of the closure element that may in particular be elastically deformable as a result of a movement of the closure element into one end position, in particular the first end position, in order thereby to preload the closure element towards a movement directed away from the other end position, in particular the second end position, and to be able to compensate any thermal expansions and/or contractions of the valve. For example, such a compensation element may be formed by a section of the closure element made of a rubber or plastic and/or by a spring.

A connection section at which the compensation element may be arranged in some embodiments may, for example, be a section that is connected to the closure element and that may be movable together with the closure element relative to the housing of the valve or ejector. For example, the connection section may comprise a plunger that is arranged between the closure element and the drive and that transmits a force from the drive to the closure element. Due to an arrangement of the compensation element at such a section, the compensation element may thus also be arranged in a force transmission path from the housing to the closure element to be able to compensate any mechanical stresses.

In some embodiments, the valve or the ejector may comprise a spindle drive for driving the closure element, said spindle drive having a spindle nut or spindle that may be driven to make a rotational movement, wherein the spindle nut or spindle may be supported at the housing, in particular via a bearing (preferably a rolling element bearing), by the compensation element. The spindle nut or spindle may in particular be drivable by the drive only to make a rotational movement, but not an axial movement. If the closure element is connected to a spindle that is rotationally fixedly but axially displaceably supported, the closure element may be driven in the axial direction by a threaded engagement of the rotating spindle nut with the spindle. If—in other embodiments—the closure element is connected to a spindle nut that is rotationally fixedly but axially displaceably supported, the closure element may be driven in the axial direction by a threaded engagement of the rotating spindle with the spindle nut.

In such embodiments, axial forces transmitted to the closure element may in particular be transmittable to the spindle nut or spindle so that the compensation element may be arranged in a force transmission path from the housing to the closure element and the closure element may also be supported at the housing via the compensation element. Furthermore, a direct or indirect support of the spindle nut or spindle may again in particular be provided.

The spindle nut or spindle may be driven via a drive shaft, for example. The drive shaft may, for example, form a motor shaft of a motor of the drive.

The drivable spindle nut or spindle may be preloaded towards the first end position, in particular via a bearing, by the compensation element. In some embodiments, the spindle nut or spindle may in particular be preloaded towards the first end position by the compensation element when the closure element is positioned in the first end position. As explained above, the closure element may thereby also be preloaded in the direction of a movement directed towards the throughflow opening when the closure element is positioned in the first end position to be able to compensate both thermally induced expansions and contractions of the housing.

In some embodiments, the drivable spindle nut or spindle, on the one hand, and a drive shaft, on the other hand, may be rigidly connected to one another, wherein the drive shaft is axially movable relative to an associated drive. For example, the drive shaft may be formed by a rotor of an electric motor that is axially movable relative to an associated stator of the electric motor; or the drive shaft may be rotationally fixedly but axially movably connected to a rotor of an electric motor. A slight axial movability of the drive shaft is generally sufficient. In other embodiments, the drivable spindle nut or spindle, on the one hand, and the drive shaft, on the other hand, may be connected fixed for rotation with one another, but axially displaceably relative to one another. In such embodiments, the spindle nut or spindle may in particular be axially movable relative to a drive shaft that is axially fixed with respect to the housing. Furthermore, a bearing of the spindle nut or spindle may in particular also be arranged in an axially movable manner relative to the drive shaft. Such an axially movable connection may in particular enable a movement of the closure element while bypassing the drive—through elastic deformation of the compensation element—to be able to compensate contractions or expansions of the housing, wherein, however, due to the constantly rotationally fixed coupling of the spindle nut or the spindle to the drive, a targeted movement of the closure element by the drive is also possible at any time.

In some embodiments, the valve or the ejector may comprise a motor, in particular a stepper motor, by which a drive shaft may be driven.

The compensation element may further be configured as a spring, in particular a plate spring, in some embodiments. In particular, a plate spring as a compensation element may make it possible to absorb relatively large forces with a small spring excursion so that minor expansions and/or contractions of the valve or ejector may be reliably mechanically compensated by such a plate spring.

Furthermore, in some embodiments, the valve or the ejector may comprise a controllable drive for the closure element and the valve or the ejector may be connected to a control device that is configured to position the closure element in accordance with one of the methods explained above. In such embodiments, provision may thus in particular be made that, in addition to the described mechanical compensation of expansions and/or contractions, a technical control compensation is also to be performed by the positioning method explained.

The invention further relates to a valve and/or ejector system that comprise a valve or an ejector and a closure element that is movable between a first end position and a second end position, wherein the closure element blocks a throughflow of fluid or gas through a throughflow opening of the valve or ejector in the first end position and releases the throughflow opening in the second end position for a throughflow of the fluid or gas. Furthermore, the system comprises a drive, in particular an electric drive, for moving the closure element and a control device that is configured to position the closure element in accordance with a method of the kind described herein.

The control device may in particular be provided to control the drive to move the closure element such that the closure element is positioned in accordance with a method of the kind described herein. The control device may in this respect be provided directly for the valve or the ejector or be part of a control device of an apparatus in which the valve or the ejector is installed. For example, the control device may be part of a control device of a refrigeration system, a heating system or refrigeration equipment or be formed by such a control device in order, for instance, to be able to position closure elements of valves or ejectors installed in a refrigeration system in accordance with the method explained. The control device may comprise a CPU (Central Processing Unit) and/or a microcontroller.

Since the control device is configured to position the closure element in accordance with the method explained, thermally induced expansions or contractions of the valve or ejector of the valve and/or ejector system may be compensated while the throughflow opening of the valve or ejector is closed by the closure element. It may hereby, for example, be ensured that the throughflow opening remains reliably closed or released despite possible thermal expansions of the valve or ejector but, on the other hand, that any thermal stresses that build up do not lead to a wedging or jamming of the closure element and that the throughflow opening may be reliably opened or closed. Furthermore, a possible incorrect positioning of the closure element in the one end position may be compensated.

In some embodiments, the drive may comprise a stepper motor. For example, the stepper motor may be part of a spindle drive whose spindle or spindle nut is connected to the closure element. The closure element may further in particular be movable in a translatory manner between the first end position and the second end position.

Furthermore, in some embodiments, the closure element may be configured as a valve needle. For example, the closure element may be provided to selectively close or release a valve seat of a seated valve or an ejector.

In some embodiments, the at least one valve and/or the at least one ejector may further be configured in accordance with any one of the embodiments of a valve or ejector explained above that has an elastically deformable compensation element that is arranged in a force transmission path from a housing of the valve to the closure element. Thus, in some embodiments, the valve and/or ejector system may comprise at least one valve and/or at least one ejector according to any of these embodiments.

The invention furthermore relates to a refrigeration system, refrigeration equipment or a heating system comprising a valve or ejector system of the kind explained above and/or a valve and/or an ejector according to any one of the embodiments explained above in which an elastically deformable compensation element is provided.

In a refrigeration system, refrigeration equipment or a heating system, a refrigeration or heating circuit may in particular be provided, wherein, for example, a liquid refrigerant may be supplied to an evaporator in order to extract the heat required for evaporating the refrigerant from the environment. The evaporated refrigerant may then be fed to a compressor and be compressed to condense in a condenser and to output heat in so doing. The liquefied refrigerant may be fed to the evaporator again. Furthermore, an expansion valve may be connected between the condenser and the evaporator to reduce the pressure of the liquid refrigerant supplied. In such a circuit, an ejector may, for example, be provided to suck in non-evaporated refrigerant and to perform a pre-compression in order thereby to relieve the compressor. Depending on the arrangement of the evaporator and the condenser, such a circuit may in particular be used in a refrigeration system or a heating system. Furthermore, such a refrigeration circuit may, for example, be used in refrigeration equipment, such as a refrigerator.

A refrigeration system having a refrigeration circuit that comprises an ejector and a plurality of valves is, for example, described in DE 10 2016 123 277 A1 whose content is explicitly included in the present disclosure with respect to the design of such a refrigeration circuit and the configuration of an ejector and a refrigeration/heating system.

In general, a plurality of valves or ejectors comprising respective closure elements may be provided in refrigeration or heating circuits to be able to influence the operation of the evaporator, the compressor, the condenser or the expansion valve and/or to be able to stop the operation if necessary. Furthermore, in particular in such circuits or the corresponding systems, relatively large temperature differences may occur between individual sections and may lead to the thermal stresses explained. A changing environmental temperature may also result in such stresses. The valve and/or ejector system disclosed herein and/or the valve or the ejector disclosed herein comprising a mechanical compensation of thermal stresses is therefore in particular suitable for use in such refrigeration systems, refrigeration equipment or heating systems to be able to compensate such stresses and achieve a reliable operation.

The invention therefore also relates to the use of a valve and/or ejector system of the kind explained above and/or a valve or an ejector according to any one of the embodiments explained above comprising an elastically deformable compensation element in a refrigeration system, in refrigeration equipment, or in a heating system.

DRAWINGS

The invention will be explained in the following purely by way of example with reference to embodiments and to the drawings. There are shown:

Figure 7A:
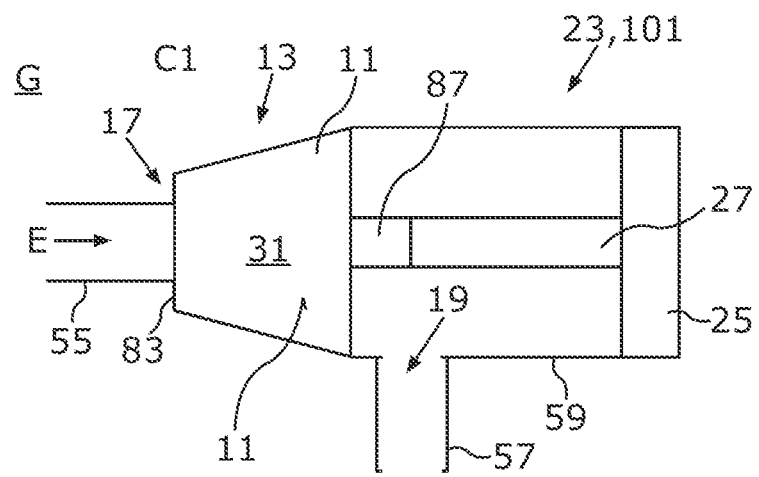
Figure 7B:
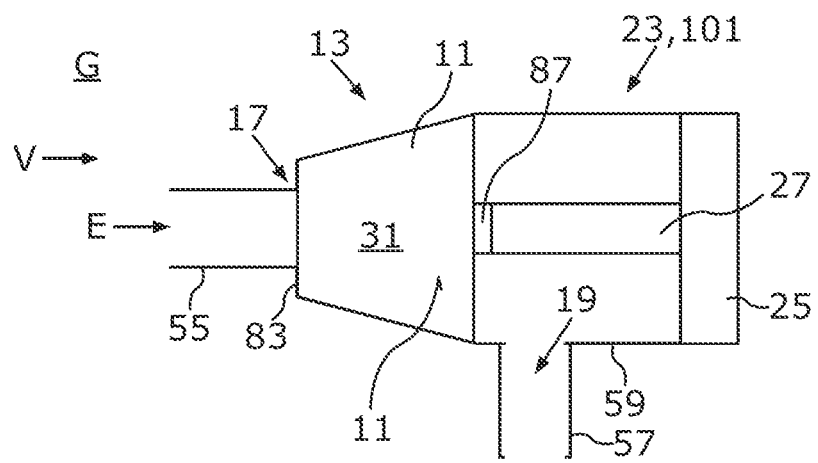
Figure 7C:
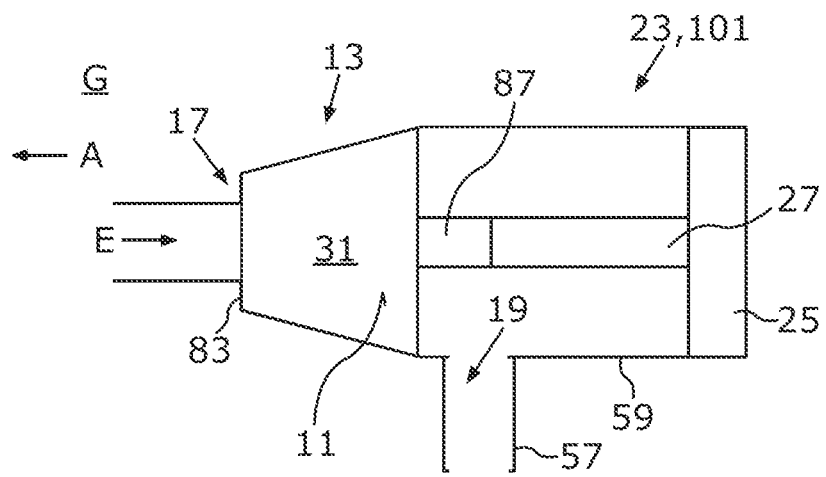
Figure 8A:
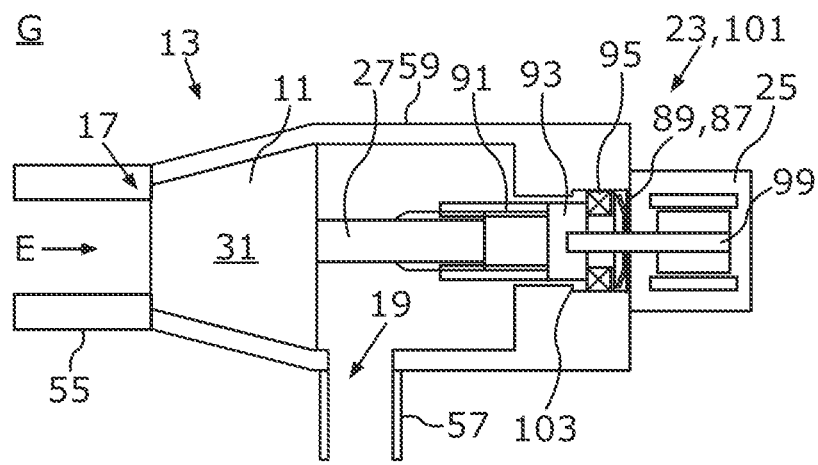
Figure 8B:
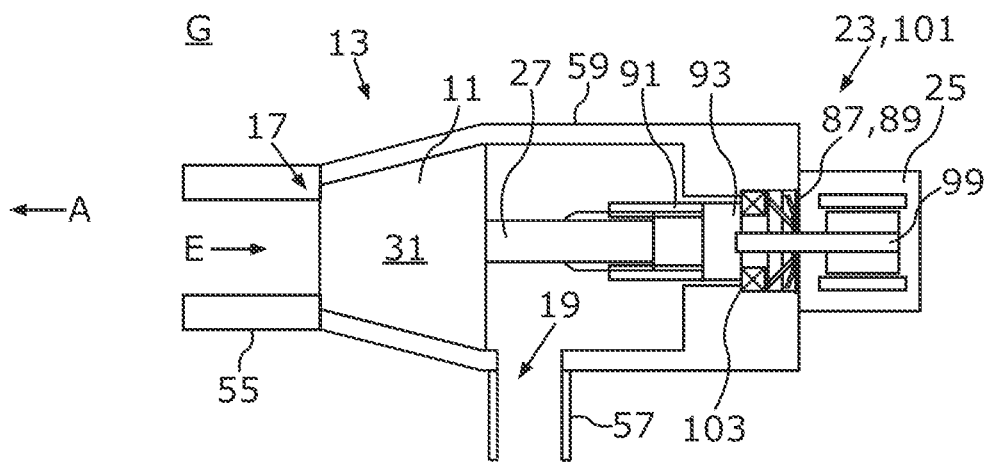
Figure 8C:
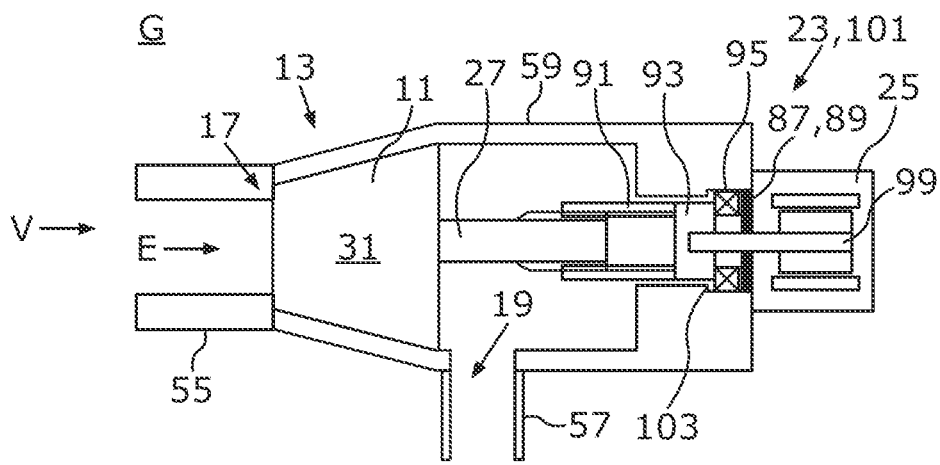

FIGS. 7A to 7C are schematic representations of a valve comprising a closure element, which is movable between a first end position and a second end position and in which an elastically deformable compensation element is arranged in a force transmission path from a housing of the valve to the closure element, for illustrating a mechanical compensation of expansions and contractions of the housing when the closure element is positioned in the first end position; and FIGS. 8A to 8C are schematic representations of a further embodiment of a valve comprising an elastically deformable compensation element that is arranged in a force transmission path from a housing of the valve to a closure element.

DETAILED DESCRIPTION OF THE INVENTION

FIGS. 1A to 1D schematically show a valve 13 that has an inlet 55 and an outlet 57 so that an inlet flow E of a fluid or gas may flow in through the inlet 55 and leave the valve 13 as an outlet flow F through the outlet 57. In this respect, the inlet flow E of fluid or gas enters a housing 59 through a throughflow opening 17 and the outlet flow F leaves said housing 59 through an outlet opening 19 of the outlet 57. In the embodiment shown, the inlet flow E in this respect changes its direction within the housing 59 so that the outlet flow F is oriented perpendicular to the inlet flow E. However, this is not mandatory; rather, a deflection within a valve 13 may generally take place about any desired angle or an inlet flow E may be guided in a straight line through a valve 13. Furthermore, a valve 13 may also have more than one inlet 55 and/or more than one outlet 57.

Figure 1A:
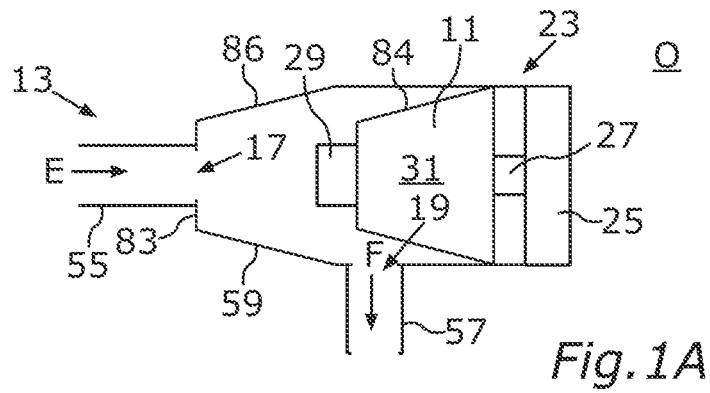
FIGS. 1A to 1D illustrate respective schematic representations of a valve comprising a closure element, which is movable between a first end position and a second end position, in the second end position, an intermediate position, a blocking position or the first end position.
Figure 1B:
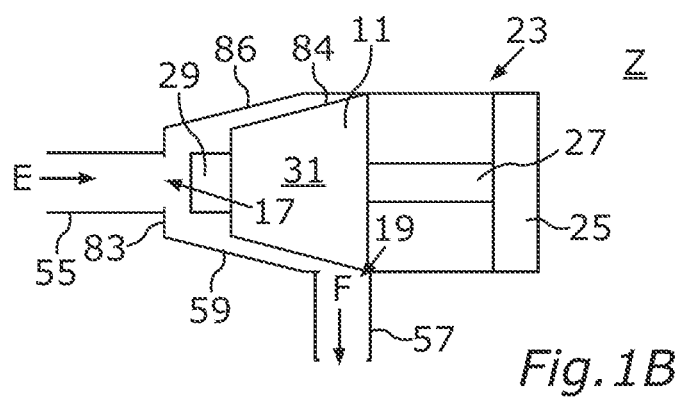
Figure 1C:
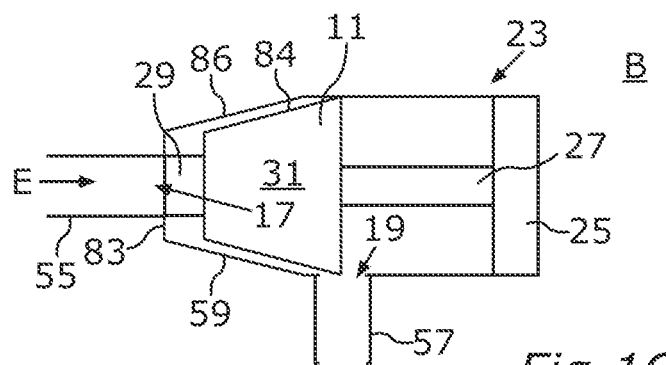
Figure 1D:
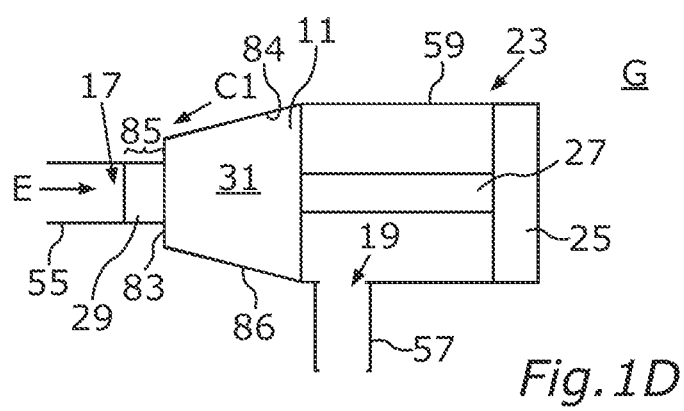

To be able to regulate the flow of fluid or gas through the housing 59, the valve 13 further has a closure element 11 movable between a second end position O shown in FIG. 1A, which may also be referred to as the open position, and a first end position G shown in FIG. 1D, which may also be referred to as the closed position, and a drive 23 for moving the closure element 11. In the schematically shown embodiment, the closure element 31 is movable in a translatory manner between the second end position O and the first end position G and is configured as a valve needle 31 that is shown with a prolongation 29 to illustrate the mode of operation. To drive the closure element 11, the drive 23 has an electric motor 25 that may comprise a stator and a rotor (not shown) and that may in particular be a stepper motor. The motor 25 is connected to the closure element 11 via a spindle 27 (shown here only in simplified form), wherein a rotation of a motor shaft of the motor 25 may be converted into a translatory (axial) movement of the closure element 11.

In the second end position O shown in FIG. 1A, the closure element 11 is at a maximum distance from the throughflow opening 17 and the throughflow opening 17 is released for a throughflow of fluid or gas. Therefore, the inlet flow E may enter the housing 59 and leave it as an outlet flow F through the outlet opening 19 and the outlet 57.

However, starting from the second end position O, the closure element 11 may be moved by the drive 23 towards the throughflow opening 17 and into various intermediate positions Z to regulate the flow of fluid or gas through the valve 13. FIG. 1B shows such an intermediate position Z in which the throughflow opening 17 is indeed still released and the inlet flow E may enter the housing 59, but the closure element 11 already limits the space available for the entry of fluid or gas. By moving the closure element 11 into the intermediate position Z, a magnitude of the outlet flow F may therefore be reduced compared to a positioning of the closure element 11 in the second end position O, wherein this magnitude may be further reduced by increasingly moving the closure element 11 towards the throughflow opening 17.

By further moving the closure element 11 towards the throughflow opening 17, the closure element 11 may furthermore be moved into a blocking position B illustrated in FIG. 1C in which the prolongation 29 covers the throughflow opening 17 and thereby prevents the inlet flow E from entering the housing 59. Already in this position of the closure element 11, the throughflow opening 17 is thus blocked and is closed against an entry of the inlet flow E so that a throughflow of fluid or gas is blocked in the blocking position B and no outlet flow F exits from the outlet 57.

However, in the blocking position B shown in FIG. 1C, the closure element 11 is not yet in an end position with respect to a movement towards the throughflow opening 17 so that the closure element 11 may be moved even further up to and into a first end position G shown in FIG. 1D in which the throughflow opening 17 is completely closed by the closure element 11. The closure element 11 in particular contacts a boundary 83 of the throughflow opening 17 in the first end position G, wherein the closure element 11 may exert a first closing force C1 on the boundary 83 as a result of the movement into the first end position G and may close the throughflow opening 17 with the first closing force C1. The boundary 83 may in particular be a seal of the throughflow opening 17, wherein such a seal may in particular be deformed by moving the closure element 11 into the first end position G and by exerting the first closing force C1.

In the present schematic representations, the closure element 11 is shown by way of example with the prolongation 29 to be able to illustrate the individual positions of the closure element 11 and in particular the blocking position B as a position already blocking the throughflow opening 17 and the first end position G as an end position of the movement of the closure element 11. However, in the case of valves 13, provision may be made that the closure element 11 does not have a prolongation 29 and the first end position G and the blocking position B are defined primarily by a respective force exerted by the closure element 11 on a boundary 83 or a seal of the throughflow opening 17.

Furthermore, in the first end position G, the throughflow opening 17 may also be blocked against a throughflow of fluid or gas by conical surfaces 84 of the closure element 11 being in contact with correspondingly shaped inner surfaces 86 of the housing 59 so that, in the case of valves 13, an axial abutment does not necessarily have to be provided for the closure element 11, but the throughflow opening 17 may also be blocked solely by the conical surfaces 84 being in contact with the inner surfaces 86. In such embodiments, a further movement of the closure element 11 is, however, also prevented by the conical surfaces 84 being in contact with the inner surfaces 86.

The blocking position B may therefore generally be defined by that position of the closure element 11 in which the throughflow opening 17 is just blocked against a throughflow of fluid or gas and no outlet flow F passes out of the valve 13. The first end position G, on the other hand, may be defined by that position in which the closure element 11 exerts a first closing force C1 on the boundaries 83 or seals of the throughflow opening 17 that corresponds to a force that may be transmitted by the drive 23 to move the closure element 11 into the first end position G. The first end position G and the blocking position B further define a blocking region 85 of the valve 13, wherein no fluid or gas enters the housing 59 through the throughflow opening 17 when the closure element 11 is positioned in the blocking region 85.

In some embodiments, the motor 25 may be designed as a stepper motor and the motor may be controlled to move the closure element 11 into the first end position G such that after reaching the first end position G, the motor 25 is still controlled to perform further steps and experiences step losses. It may be ensured by such a control that the closure element 11 actually reaches the first end position G. Furthermore, a motor current of the motor 25 and thus the force that may be transmitted to the closure element 11 by the drive 23 may, for example, be settable so that the first closing force C1 with which the closure element 11 closes the throughflow opening 17 in the first end position G may be settable as the force transmittable from the motor 25. Furthermore, the absolute position of the first end position G may also depend on the set force transmittable by the drive 23 since, for example when setting a larger force, another step may, for instance, be performed after impacting a seal of the throughflow opening 17 and the seal may be further compressed, whereas, when setting a smaller force, this step may no longer be performed and the first end position G has already been reached one step earlier.

Figure 2A:
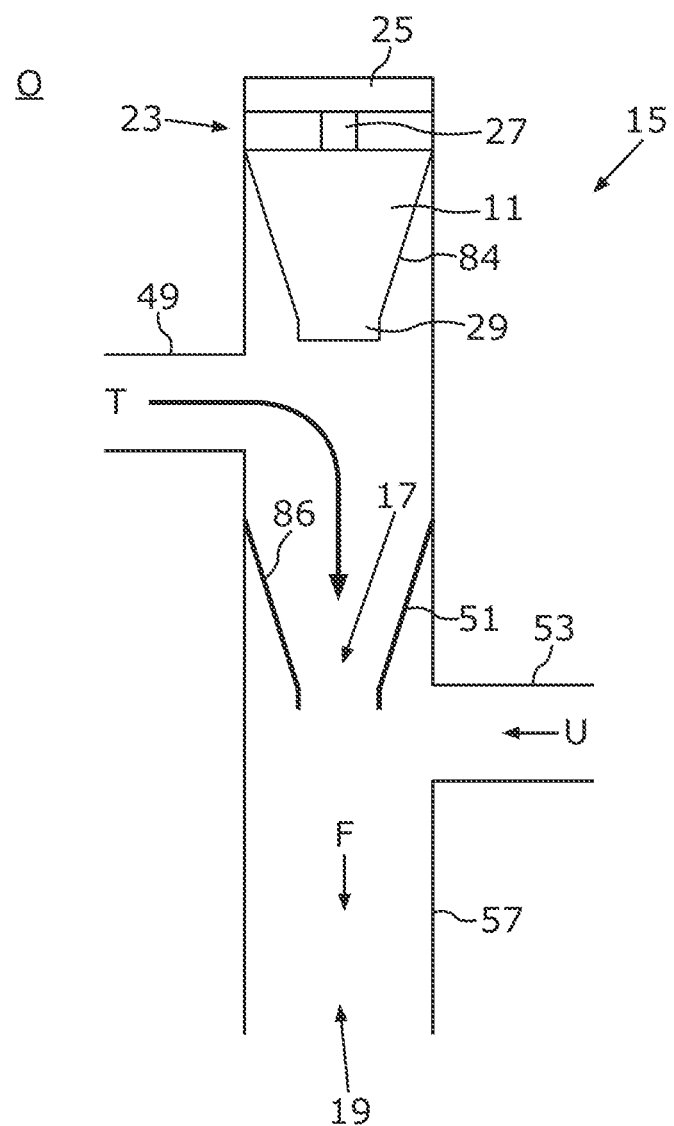
FIGS. 2A and 2B illustrate schematic representations of an ejector comprising a closure element, which is movable between a first end position and a second end position, in the second end position or the first end position.
Figure 2B:
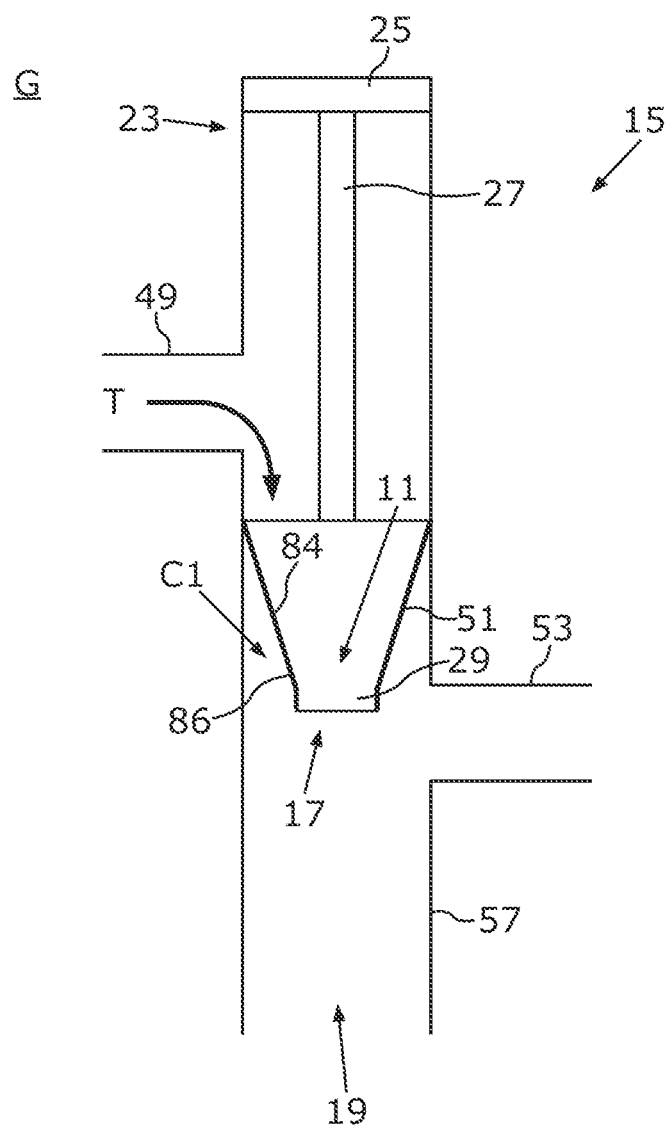

FIGS. 2A and 2B further schematically illustrate an ejector 15, which likewise comprises a closure element 11 movable in a translatory manner between a second end position O and a first end position G, and a drive 23 for moving the closure element 11. The drive 23 again has a motor 25 that is connected by way of example via a spindle 27 to the closure element 11 to be able to move the closure element 11 in a translatory manner. For the purposes of illustration, the closure element 11 is again shown with a prolongation 29, wherein such a prolongation 29, however, does not necessarily have to be provided.

The ejector 15 has a drive connector 49 through which a drive flow T may enter the ejector 15. The drive flow T is guided through a drive nozzle 51 and is thereby accelerated to leave the drive nozzle 51 through a throughflow opening 17. Due to the negative pressure that arises due to the acceleration of the drive flow T, a suction flow U of a secondary fluid (or secondary gas) is sucked in through a suction connector 53 so that the drive flow T and the suction flow U leave the ejector 15 as an outlet flow F through an outlet 57 and an outlet opening 19 of the ejector 15.

In the second end position O of the closure element 11 shown in FIG. 2A, the throughflow opening 17 is open for a throughflow of fluid or gas and in particular of the drive flow T. However, as FIG. 2B shows, the throughflow opening 17 may be closed with a first closing force C1 by moving the closure element 11 into the first end position G so that the drive flow T cannot flow through the throughflow opening 17. Due to the lack of negative pressure, the suction flow U is also not sucked in and no outlet flow F leaves the ejector 15 so that the outlet flow F, as already explained with reference to FIGS. 1A to 1D for the valve 13, may ultimately be influenced and in particular suppressed by positioning the closure element 11.

In the first end position G, in particular conical surfaces 84 of the closure element 15 contact correspondingly shaped inner surfaces 86 of the drive nozzle 51 to thereby block the throughflow opening 17 against a throughflow of fluid or gas so that no axial end stop or peripheral boundary 83 of the throughflow opening 17, which the closure element 15 axially abuts in the first end position G, is provided in the ejector 15. Nevertheless, as a result of the movement into the first end position G, the closure element 15 may abut the inner surfaces 86 of the drive nozzle 51 so that a further movement away from the second end position O may be blocked due to this abutting and the first end position G may again be defined as a position of the closure element 15 in which a force transmitted to the closure element 15 by the drive 23 is compensated and a further movement away from the second end position O is prevented.

In summary, in the ejector 15 or the valve 13, a closure element 11 that is movable between a second end position O and a first end position G may thus be provided to regulate, and in particular to be able to selectively release or block, a throughflow of fluid or gas through a respective throughflow opening 17, wherein, in the first end position G, a flow through the valve 13 or the ejector 15 is blocked and no outlet flow F leaves the valve 13 or the ejector 15. In the first end position G of the closure element 11, there is therefore no mass flow through the valve 13 or the ejector 15, wherein this lack of a mass flow may, however, lead to thermal changes in components of the valve 13 or the ejector 15 that may be reflected in thermal stresses acting on the closure element 11 and/or the housing 59. In particular, these stresses may in this respect arise due to different thermal expansion coefficients of individual components of the valve 13 or the ejector 15 when the valve 13 or the ejector 15 cools down or heats up due to the lack of a mass flow.

For example, a lack of a throughflow of a warm medium may cause the valve 13 or the ejector 15, in particular the housing 59 of the valve 13 or ejector 15, to contract as a result of a cooling and to transmit a stress force to the closure element 11. Due to such stresses, the closure element 11 may, however, possibly jam in the first end position G so that the closure element 11 may no longer be released from the first end position G to be moved into an intermediate position Z or the second end position O and to enable a throughflow of fluid or gas at a later point in time. Conversely, however, a lack of a mass flow may also result in an expansion of the valve 13 or the ejector 15 or the respective housing 59, due to which expansion the closing force C1 exerted by the closure element 11 may be reduced, which may possibly lead to an unwanted leakage. Furthermore, even after the closure element 11 has been moved into the second end position O, stresses may possibly occur that jam the closure element 11 so that the closure element 11 may possibly no longer be moved into the first end position G to close the throughflow opening 17 and the valve 13 or the ejector 15 may no longer be actuated.

Figure 3:
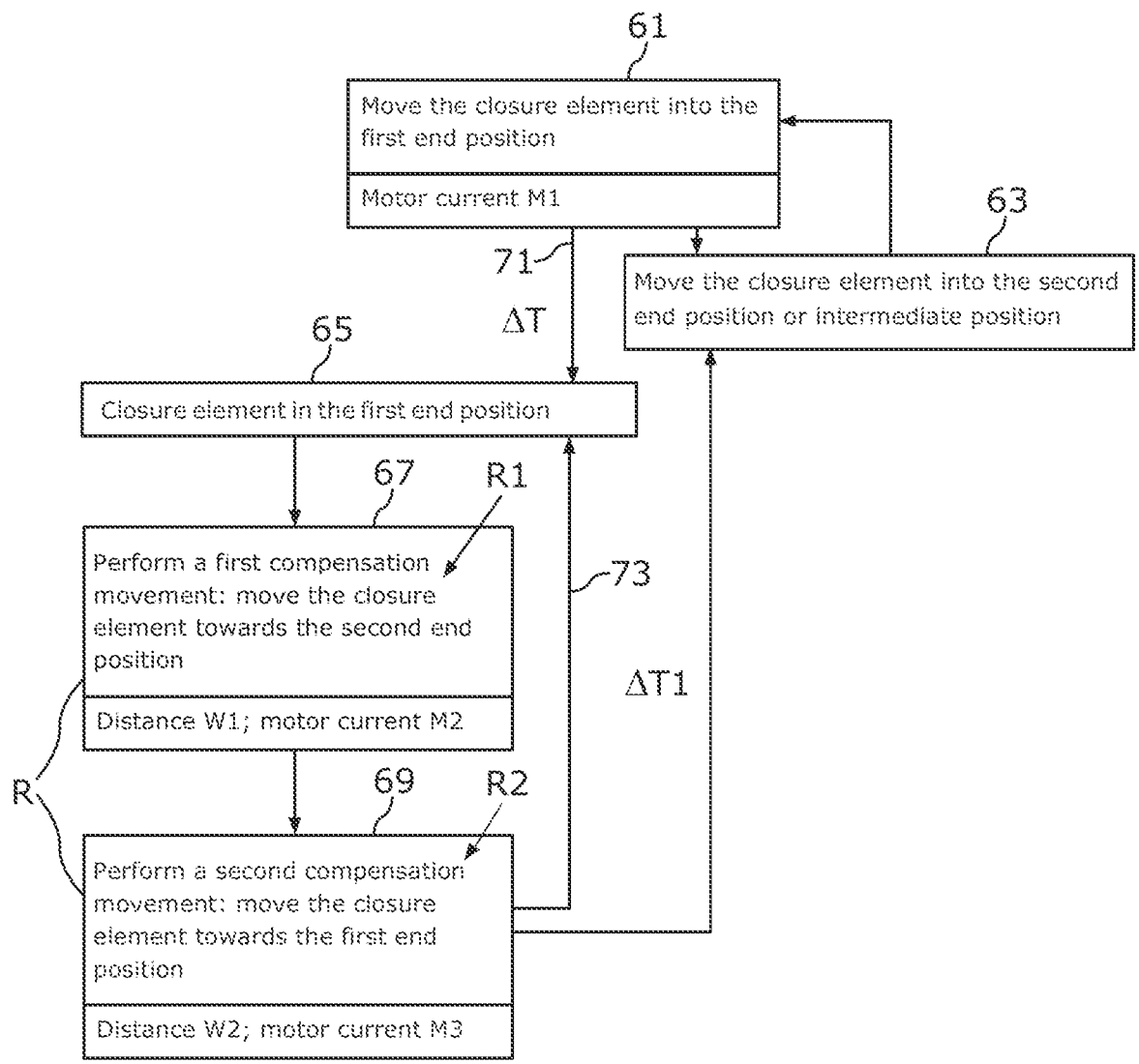
FIG. 3 is a block diagram for illustrating a method for positioning a closure element of a valve or ejector.

However, to compensate such mechanical stresses and to be able to achieve a reliable closing of the respective throughflow opening 17 of the valve 13 or ejector 15 after the closure element 11 has been moved into the first end position G, provision may, however, be made to position the closure element 11 in accordance with a method illustrated by means of FIG. 3. Furthermore, the method may be applied in an analogous manner after moving the closure element 11 into the second end position O in order to prevent a jamming of the closure element 11 and to enable a reduction of stress forces.

In the method described herein, the closure element 11 is first moved into the first end position G or the second end position O, in the method according to FIG. 3 by way of example into the first end position G, so that the throughflow opening 17 is closed and a flow of gas or fluid through the throughflow opening 17 is blocked. For this movement of the closure element 11 into the first end position G, the motor 25 may in particular be operated with a first motor current M1 to close the throughflow opening 17 with the first closing force C1 already mentioned. If necessary, the valve 13 or the ejector 15 may thereafter be opened in a step 63 by moving the closure element 11 into an intermediate position Z or the second end position O. Starting therefrom, the step 61 may be repeated if necessary and the closure element 11 may be moved into the first end position G.

However, if the closure element 11 is not moved out of the first end position G within a waiting time ΔT, for example a waiting time of 10 seconds, it may be checked in a step 71 after the waiting time ΔT whether the closure element 11 is still in the first end position G and this positioning may be recognized in a step 65. This may in particular take place in that no command to move the closure element 11 is recognized during the waiting time ΔT. If the closure element 11 is thus still in the first end position G after the waiting time ΔT or if the throughflow opening 17 is still closed, a compensation cycle R may be performed in steps 67 and 69 during which the closure element 11 is triggered to perform a first compensation movement R1 towards the second end position O, and thus the other end position O compared to the first end position G, and to perform a second compensation movement R2 towards the first end position G and thus the one end position G into which the closure element 11 was originally moved.

In particular, the closure element is, by way of example in the step 67, first triggered to perform the first compensation movement R1 towards the second end position O, wherein the closure element 11 may in particular be moved along a first distance W1 towards the second end position O. This first compensation movement R1 enables the valve 13 or the ejector 15 to release a possibly built-up thermal stress by performing a contraction. The motor 25 may furthermore be controlled to move the closure element 11 towards the first end position O with a motor current M2 that may in particular be greater than the motor current M1. It may thereby be achieved that the closure element 11 may also be released from the first end position G in the event of any stresses building up during the waiting time ΔT due to contractions of the valve 13 or the ejector 15.

After moving the closure element 11 by the distance W1 towards the second end position O, the closure element 11 may be triggered in the step 69 to perform the second compensation movement R2 towards the first end position G. In particular, the drive 23 may in this respect be triggered to move the closure element 11 along a second distance W2 towards the first end position G, wherein the second distance W2 may be greater than the first distance W1. It may be achieved by such a selection of the distance W2 that any expansions of the valve 13 or the ejector 15 may also be compensated in that the closure element 11 may so-to-say track such expansions and a thereby resulting moving away of the throughflow opening 17. If, however, a contraction of the valve 13 or the ejector 15 takes place, the closure element 11 cannot cover the entire second distance W2, but a motor shaft of the motor 25 is already blocked before the second distance W2 is covered. Furthermore, due to such a selection of the distances W1 and W2, the closure element 11 may increasingly be moved further into the mechanical first end position G by the compensation cycle R if the closure element 11 has not fully reached the first end position G, for example, during the step 61 due to step losses of the motor 25 so that any incorrect positionings of the closure element 11 may also be compensated.

The first distance W1 and the second distance W2 may in particular be defined by respective step numbers S1 and S2 in that a motor 25 configured as a stepper motor may be controlled to drive the first compensation movement R1 towards the second end position O in order to perform a first number of steps S1 and to drive the second compensation movement R2 towards the first end position G in order to perform a second number of steps S2. The second number of steps S2 may in this respect be greater than the first number of steps S1, in particular by exactly one step, so that, by performing the steps 67 and 96, in particular expansions of the valve 13 or of the ejector 15 may be compensated by the distance of the closure element 11 to be covered in one step of the stepper motor 25. For example, provision may be made to move the closure element 11 by two steps towards the second end position O and by three steps towards the first end position G. Furthermore, the closure element 11 may be movable by less than 10 μm, in particular by approximately 7 μm, by one step of the stepper motor 25.

The closure element 11 may generally be moved back into the first end position G by the step 69. However, it is possible that, during the waiting time ΔT, expansions of the valve 13 or of the ejector 15 occur that cannot be completely compensated by performing the compensation cycle R and the steps 67 and 69 once so that, in the step 69, the closure element 11 does not necessarily again reach the first end position G in which the throughflow opening 17 is closed with the force that may be transmitted to the closure element 11 by the drive 23. Nevertheless, due to such a tracking by the closure element 11, expansions may be compensated and it may be achieved that the closure element 11 at least remains in the blocking region 85 to prevent a leakage. Furthermore, larger expansions may also be fully compensated by cyclically repeating the steps 67 and 69.

In the step 69, the closure element 11 may further be moved with a third motor current M3 towards the first end position G and in particular up to and into the first end position G. In this respect, the motor current M3 may in particular be smaller than the motor current M1 and/or may, for example, amount to 80% of the motor current M1 so that the throughflow opening 17 may be closed with a reduced second closing force C2 compared to the first closing force C1 as a result of the step 69. Loads on components of the valve 13 or the ejector 15 as a result of the movements of the closure element 11 may in particular be minimized by reducing the closing force and a more clearly defined and constant closing force may furthermore be set. However, it is also possible that the motor current M3 corresponds to the motor current M1 and the throughflow opening 17 is closed with the first closing force C1 again as a result of the second compensation movement R2.

Thus, by performing the steps 67 and 69, any thermal stresses and both contractions and expansions of the valve 13 or the ejector 15 that occur during the waiting time ΔT may be compensated. To be able to compensate further possibly occurring thermal stresses even when the closure element 11 remains in the first end position G for a longer time period, the compensation cycle R may be cyclically repeated and, after the step 69 has been performed and the closure element 11 has been moved towards the first end position G, it may again be checked in a step 73 after a cycle time ΔT1, which may in particular correspond to the waiting time ΔT, whether the closure element 11 is in the first end position G or has at least not been transferred into an intermediate position Z. If this is the case, the compensation cycle R may be repeated with the steps 67 and 69 to be able to release further stresses built up during the cycle time ΔT1. The triggering of the closure element 11 to perform the first compensation movement R1 towards the second end position O and to perform the first compensation movement R2 towards the first end position G may thus be cyclically repeated, wherein the cycle time ΔT1 may in this respect in particular be selected to be constant or may be increased, for example, after each performance of the steps 67 and 69.

Furthermore, provision may also be made that first the second compensation movement R2 and then the first compensation movement R1 are performed during the compensation cycle R, i.e. the closure element 11 is first triggered to move towards the first end position G and is then triggered to move away from the first end position G. Mechanical stresses may also be reduced by such a procedure, wherein it may be ensured by a movement of the closure element 11 only within the blocking section 85 that no leakage occurs.

However, as an alternative to the closure element 11 remaining in the first end position G, after the step 69 has been performed, a control command to move the closure element 11 into the second end position O or an intermediate position Z and the step 63 may take place during the cycle time ΔT1, whereupon, when the closure element 11 is moved into the first end position G again, the method may be performed again in a subsequent step 61. As already mentioned, the method may, however, also be performed in an analogous manner after reaching the second end position O to be able to prevent a jamming of the closure element 11 and/or to be able to compensate possible incorrect positionings. In this regard, the steps 67 and 69 and the compensation cycle R may follow the step 69 and the reaching of the second end position O, provided that the closure element 11 is not moved out of the second end position O during the waiting time ΔT. Even after the second end position O has been reached, the compensation cycle R may, for example, be performed such that the first compensation movement R1 and thus the step 67 are performed first and the second compensation movement R2 and the step 69 are subsequently performed. Alternatively thereto, the step 69 may, however, also take place first and then the step 67.

An embodiment was explained by way of example with reference to FIG. 3 in which the compensation cycle R is performed after a waiting time ΔT after the first end position G or the second end position O has been reached. However, in some embodiments, provision may also be made that a first compensation cycle R is performed directly after one of the end positions G or O has been reached so that the closure element 11 may be triggered to perform the compensation movements R1 and R2 directly after reaching an end position G or O. A first compensation cycle R may thus take place immediately after the reaching of the end position G or O, wherein, after the completion of the first compensation cycle R, further compensation cycles R may possibly be performed and the compensation cycle R may be cyclically repeated. To that effect, provision may, for example, be made that, after the first compensation cycle R, which is performed immediately after an end position G or O has been reached, further compensation cycles R are performed with the cycle time ΔT1 between respective compensation cycles R so that a further compensation cycle R may only be performed when the closure element 11 is not moved out of the respective end position G or O during the cycle time ΔT1, for example within 10 seconds, following the completion of a respective compensation cycle R. Alternatively thereto, the further compensation cycles R may, however, also be started immediately after the completion of a respective compensation cycle R so that, in some embodiments, the closure element 11 may be moved permanently within the framework of the compensation movements R1 and R2 as long as the closure element 11 is not controlled for a movement into the respective other end position O or G or one of the intermediate positions Z mentioned.

Furthermore, in some embodiments, compensation cycles R may be performed only until a predefined maximum number of consecutive compensation cycles R has been reached, for example five or ten compensation cycles R. Once the maximum number has been reached, the closure element 11 may remain unmoved in such embodiments and a further compensation cycle R may be performed only if the closure element 11 has first been moved out of the respective end position G or O into the respective other end position O or G or one of the intermediate positions Z and thereafter back into one of the end positions G and O.

Figure 4A:
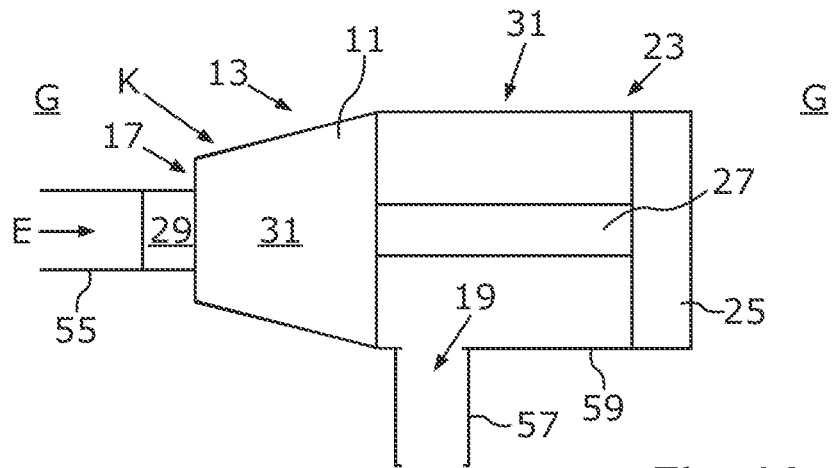
FIGS. 4A to 4C are schematic representations of a valve for illustrating a compensation of a contraction of the valve due to thermal stresses by applying the method.
Figure 4B:
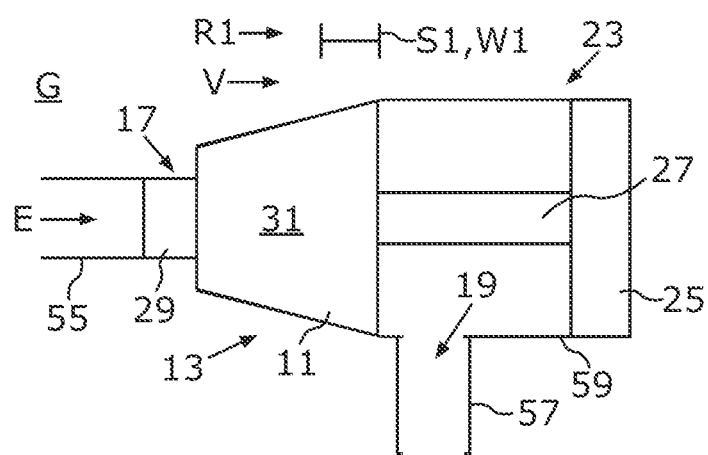
Figure 4C:
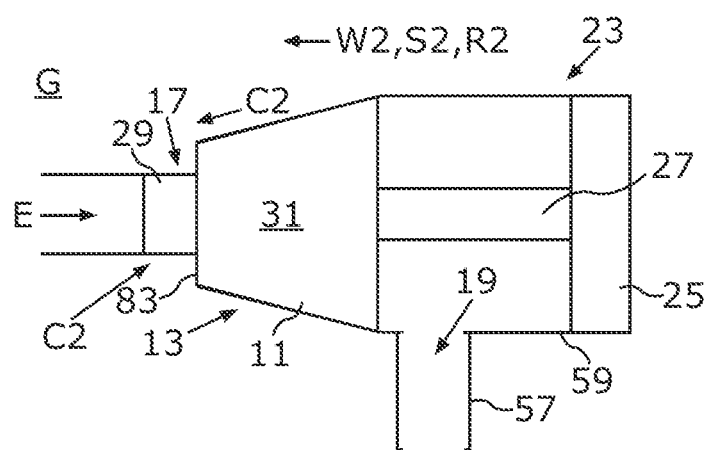

FIGS. 4A to 4C illustrate the compensation of contractions of the valve 13 due to thermal stresses by the described method after the closure element 11 has been moved into the first end position G or into the closed position.

In FIG. 4A, the valve 13 is shown with the closure element 11 positioned in the first end position G, wherein a stress force K is, however, shown that acts on the closure element 11 as a result of thermal stresses of the housing 59. If the closure element 11 is now moved towards the second end position O in the method step 67 after the waiting time ΔT and the first compensation movement R1 is performed, the valve 13 experiences a contraction V due to this stress force K, which is no longer compensated by the closure element 11, and so-to-say follows the movement of the closure element 11 (cf. FIG. 4B). Since the contraction V by way of example corresponds to the first distance W1 in the situation shown, the closure element 11 does not move away from the throughflow opening 17 despite the movement by the first distance W1 and the first number of steps S1 towards the second end position O, but remains in the first end position G. Subsequently, as FIG. 4C illustrates, the closure element 11 is indeed triggered to perform the second compensation movement R2 towards the first end position G, but since the closure element 11 is already in the first end position G, the corresponding movement is not performed and the motor 25 experiences step losses of the controlled second number of steps S2. If further stress forces K then occur or if the stress force K could not yet be completely compensated by the contraction V, these stress forces may be compensated by cyclically repeating the compensation cycle R and the method steps 67 and 69 (cf. FIG. 3).

Figure 5A:
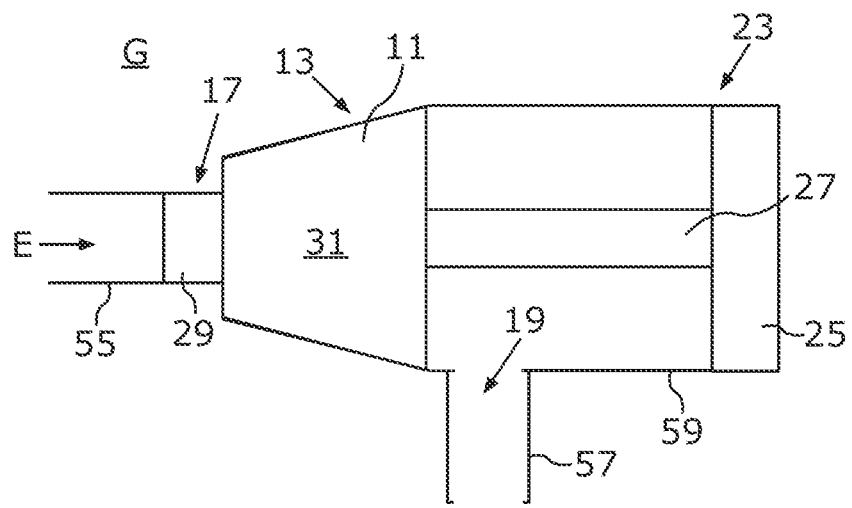
FIGS. 5A to 5D are schematic representations of a valve for illustrating a compensation of expansions of the valve due to thermal stresses by applying the method.
Figure 5B:
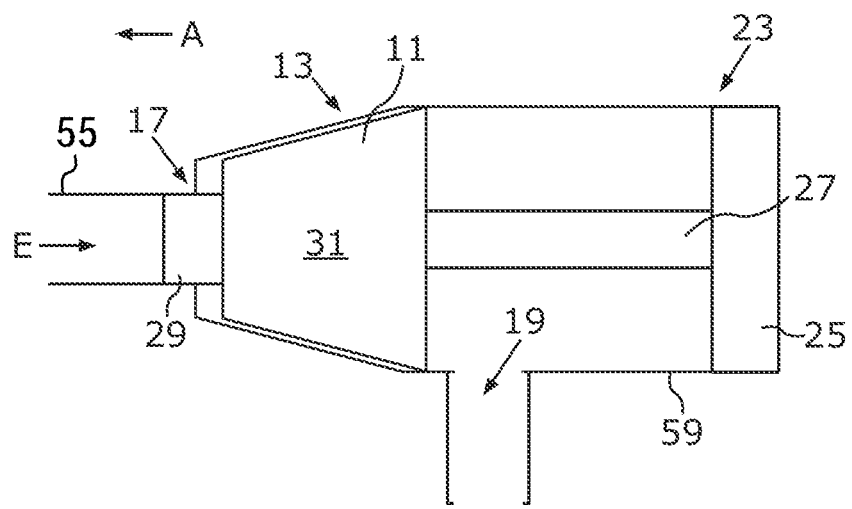

Conversely, the compensation of an expansion A is illustrated by means of FIGS. 5A to 5D, which expansion A the valve 13, with the closure part 11 positioned in the first end position G, executes due to the changing thermal conditions and/or pressure conditions, for example. In FIG. 5A, the closure element 11 is in this respect again shown in the first end position G, wherein, in the situation shown in FIG. 5B, the housing 59 experienced an expansion A due to thermal stresses so that the throughflow opening 17 is moved away from the closure element 11 and a closing force exerted by the closure element 11 is reduced.

Figure 5C:
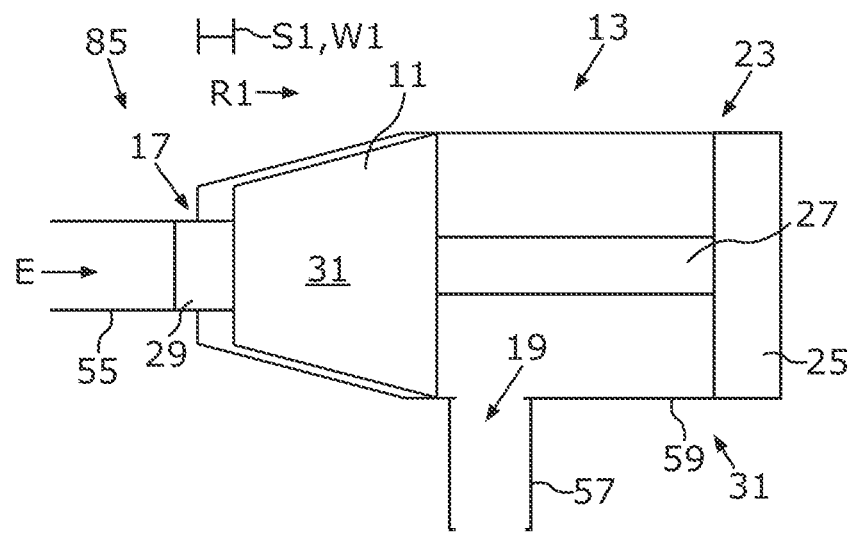
Figure 5D:
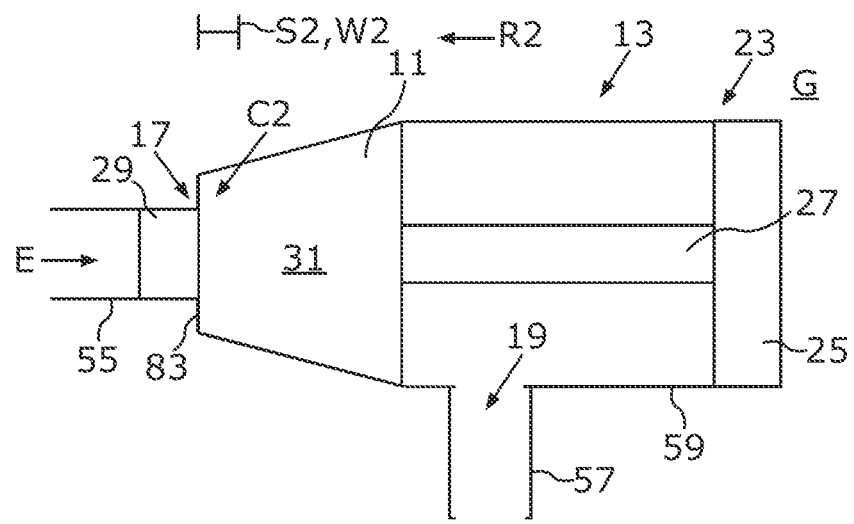

Once again, after the waiting time ΔT, the closure element 11 is moved by the first distance W1 and the first number of steps S1 towards the second end position O (cf. FIG. 5C). In this respect, the distance W1 is, however, selected to be so small that the closure element 11 remains in the blocking section 85 of the valve 13 and is only moved between the first end position G and the blocking position B so that a leakage is prevented. After the closure element 11 has been moved towards the second end position O, the closure element 11, as shown in FIG. 5D, is moved by the second distance W2 and the second number of steps S2 towards the first end position G and in particular into the first end position G, wherein the second distance W2 is greater than the first distance W1 and the second number of steps S2 is greater than the first number of steps S1. Due to this selection of the distances W2 and W1 or the step numbers S2 and S1, the closure element 11 is thus ultimately made to follow the expansion A of the valve 13 by the two opposing movements so that the throughflow opening 17 is reliably closed again after the method steps 67 and 69 have been performed. Due to the setting of the third motor current M3, the throughflow opening 17 is furthermore closed with the second closing force C2 that is reduced compared to the first closing force C1. Any further or larger expansions A of the valve 13 may be compensated by the explained cyclic repetition of the method steps 67 and 69.

Regarding the explained embodiments of a closure element 11 with a prolongation 29, it should also be noted that when the closure element 11 is moved starting from the first end position G (closed position) towards the second end position O, the prolongation 29 first prevents a throughflow of fluid or gas. Without the prolongation 29, a movement of the closure element 11 starting from the first end position G towards the second end position O, however, almost immediately causes a throughflow of fluid or gas (continuously increasing leakage). This effect may be reduced or even avoided by a compensation element 87, as will be explained below.

FIGS. 7A to 7C illustrate a valve 13 that enables a mechanical compensation of thermal stresses that build up in the first end position G or a closed position. The valve 13 is in this respect generally configured in the same way as the valve 13 illustrated, for example, by means of FIGS. 1A to 1D so that the same components are designated by the same reference numerals.

Thus, the valve 13 in particular has a drive 23 by means of which a closure element 11 may be moved between the first end position G and the second end position O, wherein a motor 25 of the drive 23 is axially immovably held at a housing 59 of the valve 13 relative to the housing 59. In FIGS. 7A to 7C, the closure element 11 is shown in the first end position G in which a throughflow opening 17 of the valve 13 is blocked against a throughflow of fluid or gas by the closure element 11. However, in contrast to the embodiment depicted by means of FIGS. 1A to 1D, the closure element 11 does not have a prolongation 29 so that the throughflow opening 17 is in particular blocked by the closure element 11 being in contact with a boundary 83 of the throughflow opening 17 when the closure element 11 is moved into the first end position G.

To enable a mechanical compensation of thermal stresses, the valve 13 furthermore has an elastically deformable compensation element 87 that is arranged in a force transmission path from the housing 59 to the closure element 11. The compensation element 87 makes it possible to absorb forces that are changing, for instance as a result of an expansion A or a contraction V of the housing 59, and that are transmitted from the boundary 83 to the closure element 11 and thereby to compensate such changes in force when the closure element 11 is positioned in the first end position G. A leakage and/or a jamming of the closure element 11 may hereby be largely prevented. This will be explained in more detail below.

FIG. 7A shows the valve 13 after the closure element 11 has been moved into the first end position G. In particular, the compensation element 87 that is arranged by way of example at the closure element 11 and that may be made of an elastically deformable material, and for example of rubber, and/or that may be configured as a spring may already be elastically deformed in this position due to the closing force C1 acting between the closure element 11 and the boundary 83 of the throughflow opening 17 and in this regard transmitted to the compensation element 87 so that the closure element 11 may be preloaded in the direction of a further movement towards the throughflow opening 17 by the compensation element 87. However, such a movement is prevented due to the closure element 11 abutting the boundary 83.

If the housing 59, for example, experiences a contraction V after the closure element 11 has been moved into the first end position G, a force is exerted by the boundary 83 on the closure element 11 and on the compensation element 87 due to this contraction V. As FIG. 7B shows, the compensation element 87 may absorb this force through an elastic deformation so that the closure element 11 may so-to-say avoid the contraction V and be moved against the preload exerted by the compensation element 87. A preload exerted on the closure element 11 by the compensation element 87 may thus indeed increase due to the contraction V so that the closure element 11 may also close the throughflow opening 17 with an increased force compared to the closing force C1, but a jamming of the closure element 11 may be avoided due to the absorption of the force by an elastic deformation of the compensation element 87. If the closure element 11 is then controlled to move into the second end position O, the compensation element 87 may first relax due to the reducing force between the motor 25 and the closure element 11 and the closure element 11 may thereupon be moved away from the throughflow opening 17 as soon as the compensation element 87 has reached an installed state.

FIG. 7C illustrates a situation in which the housing 59 experiences an expansion A after the closure element 11 has been moved into the first end position G. Since the compensation element 87 has already been elastically deformed by moving the closure element 11 into the first end position G and therefore exerts a preload on the closure element 11 towards the throughflow opening 17, the closure element 11 may so-to-say track the expansion A of the housing 59 in that the elastically deformed compensation element 87 relaxes and also expands. The closure element 11 may thereby be held in contact with the boundary 83 despite the expansion A in order to prevent an unwanted leakage.

In general, any thermal changes in length of the housing 59 may thus also be reliably compensated by such a mechanical solution. In particular, the valve 13 or its drive 23 may, however, be controllable and the valve 13 may be connected to a control device 79 (cf. also FIG. 6) that is configured to position the closure element 11 in accordance with the method explained above so that both a mechanical and a technical control compensation of changes in length of the housing 59 may be provided.

With regard to the carrying out of the explained positioning method for a valve 13 comprising an elastically deformable compensation element 87 arranged in a force transmission path from the housing 59 to the closure element 11, furthermore the peculiarity results that the first compensation movement R1 triggered during a compensation cycle R after the reaching of the first end position G may be compensated by an elastic deformation of the compensation element 87. In this regard, a force exerted by the closure element 11 on the boundary 83 may indeed be reduced by the first compensation movement R1 to reduce mechanical stresses, but the closure element 11 does not have to be moved for this purpose and the throughflow opening 17 may remain reliably closed.

The triggering of the first compensation movement is in this respect generally comparable to an expansion A of the housing 59 illustrated by means of FIG. 7C in that a force exerted by the closure element 11 on the boundary 83 is also reduced during a control by the drive 23 to move the closure element 11 away from the throughflow opening 17. Therefore, the elastically deformed compensation element 87 may also expand as a result of such a controlled movement and may thereby compensate the triggered first compensation movement R1 so that the closure element 11 does not move away from the throughflow opening 17.

FIGS. 8A to 8C show a further embodiment of a valve 13 comprising an elastically deformable compensation element 87 arranged in a force transmission path between a housing 59 of the valve 13 and a closure element 11.

In this embodiment, the drive 23 for the closure element 11 is configured as a spindle drive 101 and has a drive shaft 99 that may be set into rotation by an electric motor 25, in particular a stepper motor. The drive shaft 99 is configured to set a spindle nut 93 into rotation, wherein the spindle nut 93 is connected fixed for rotation with the drive shaft 99, but axially displaceably relative to the drive shaft 99. Alternatively thereto, the spindle nut 93 could be rigidly connected to the drive shaft 99 and the drive shaft 99 could form a rotor of the motor 25 that is axially displaceable relative to a stator. Within an internal thread 91 of the spindle nut 93, a spindle 27 is further guided that has an external thread and that is rotationally fixedly but axially movably supported in the housing 59. Thus, the spindle 27 is in threaded engagement with the spindle nut 93 and may be set into a translatory movement due to the rotation of the spindle nut 93. This translatory movement is transmitted to the closure element 11.

In this embodiment, the compensation element 87 is configured as a spring 89, in particular a plate spring, by which a bearing 95 of the spindle nut 93, and thus (via the spindle 27) the closure element 11, is preloaded towards the first end position G. The spring 89 is supported at the motor 25 that is axially fixedly connected to the housing 59 so that ultimately the spindle nut 93 and the closure element 11 are also supported at the housing 59 via the spring 89 and the compensation element 87, respectively.

FIG. 8A first shows a situation after the closure element 11 has been moved into the first end position G. In this position, the compensation element 87 is already elastically deformed and the spring 89 is compressed so that the bearing 85 of the spindle nut 93 is positioned away from an abutment 103 for the bearing 95 and the compensation element 87 exerts a preload 11 directed towards the throughflow opening 17 on the closure element 11.

If the housing 59 now experiences an expansion A, the force transmitted from the closure element 11 to the compensation element 87 is reduced so that the spring 89 may unfold and the closure element 11 may track the expansion A (cf. FIG. 8B). A maximum expansion A to be compensated is shown by way of example in FIG. 8B in which the bearing 95 contacts the abutment 103 due to the unfolding of the spring 89.

Since the spring 89 is furthermore not fully compressed in the situation illustrated in FIG. 8A after the first end position has been reached, the spring 89 may moreover be compressed further as a result of a contraction V of the housing 59 so that the closure element 11 may avoid the contraction V and a jamming of the closure element 11 may be prevented. This is illustrated in FIG. 8C. Once again, both expansions A and contractions V of the housing 59 may thus be mechanically compensated by the elastically deformable compensation element 87.

The drive 23 of the valve 13 illustrated by means of FIGS. 8A to 8C may in particular also be controllable and the valve 13 may be connected to a control device 79 to be able to position the closure element 11 in accordance with any one of the methods explained above. In particular, such an additional technical control compensation of expansions A and contractions V may also make it possible to compensate larger expansions A or larger contractions V in that the closure element 11, for instance by performing a compensation cycle R, may be moved starting from the position shown in FIG. 8B back into a position in which the bearing 95 of the spindle nut 93 is moved away from the abutment 103 (cf. FIG. 8A) so that any subsequent expansions A may again be mechanically compensated by an expansion of the spring 89. Even in the event of a complete compression of the spring 89 as a result of a contraction V of the housing 59, the original closing force C1 or a closing force C2 reduced in comparison therewith may be set by performing a compensation cycle R so that the spring 89 may unfold again and a mechanical compensation of a further contraction V may be made possible.

In general, it should also be noted that when an elastically deformable compensation element 87 is used, the drive 23 or the motor 25 may be designed to be weaker—and thus more cost-effective—than without a compensation element 87 since force peaks are avoided or at least reduced by the compensation element 87.

With reference to the Figures, only embodiments of valves 13 in which an elastically deformable compensation element 87 is arranged in a force transmission path from the housing 59 to the closure element 11 were explained above. However, this may also be implemented in an analogous manner for an ejector 15, for example the ejector 15 illustrated by means of FIGS. 2A and 2B.

Figure 6:
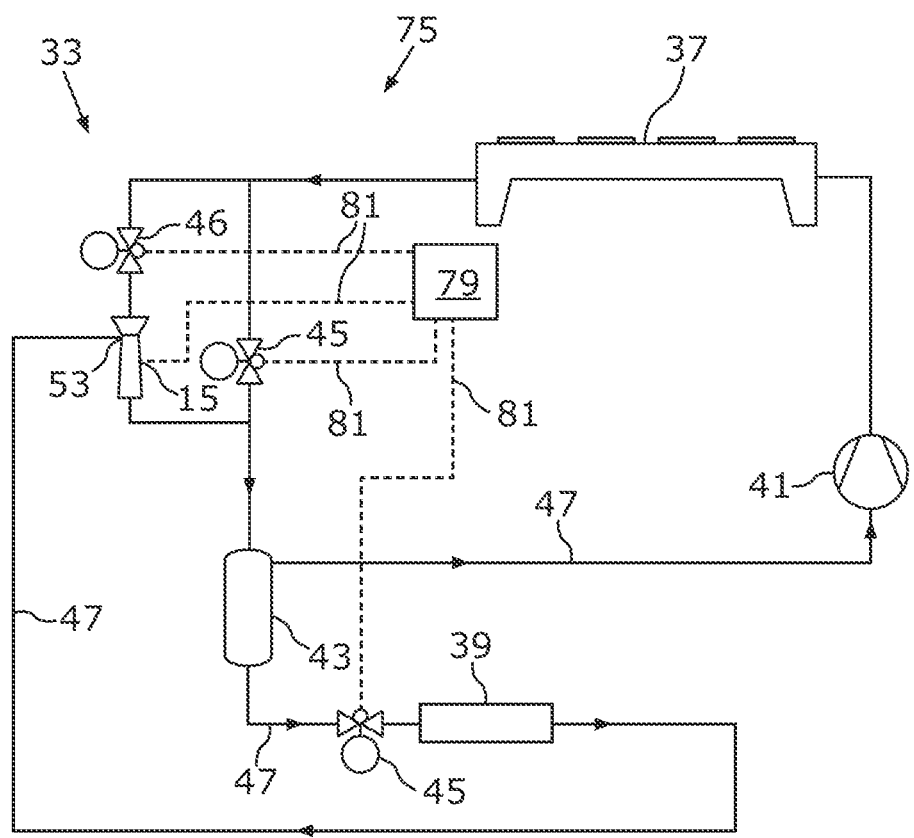
FIG. 6 is a schematic representation of a refrigeration system comprising a valve and/or ejector system in which closure elements of an ejector and a plurality of valves of the valve and/or ejector system may be positioned in accordance with the method described.

FIG. 6 schematically and by way of example shows a refrigeration or heating system 33 comprising a valve and/or ejector system 75 that has an ejector 15, two expansion valves 45, and a blocking or regulation valve 46. Furthermore, a control device 79 is provided that is configured to control respective drives via control lines 81 to move closure elements of the valves 45 and 46 and of the ejector 15 in accordance with the method explained above. The control device 79 may in particular be part of a control device that is provided for controlling the refrigeration or heating system 33 as a whole. Furthermore, the valves 45 and 46 and/or the ejector 15 may also be configured with an elastically deformable compensation element 87 to enable a mechanical compensation of changes in length of a housing 59 of the valves 45 and 46 and/or of the ejector 15 as explained above.

The illustrated refrigeration or heating system 33 comprises a container 43 for collecting refrigerant, an evaporator 39, a compressor 41 and a condenser 37 and the refrigerant is guided through lines 47, wherein arrows indicate the direction of flow of the refrigerant. Refrigerant supplied to the evaporator 39 from the container 43 via an expansion valve 45 may evaporate in the evaporator 39 and extract heat from the environment in so doing, wherein the evaporator 39 produces a mixture of gaseous and liquid refrigerant that may be sucked off by the ejector 15 via its suction connector 53 and brought to a higher pressure level. A gaseous portion of the refrigerant present in the container 43 may further be sucked in by the compressor 41 via the line 47 and supplied to the condenser 37, at which the refrigerant may be liquefied and supplied to the container via a throttle valve 45 or may be supplied as a motive fluid (or motive gas) to the ejector 15 via the blocking or regulation valve 46. In this respect, the blocking or regulation valve 46 may also be integrated into the ejector 15, as shown in FIGS. 2A and 2B, for example.

To adapt the operation of the refrigeration or heating system 33, the control device 79 may in particular be configured to control movements of closure elements 11 of the valves 45 and 46 and of the ejector 15 or their drives 23. Since, in particular in such heating or cooling systems 33, there may be relatively high temperature differences between individual sections of the system and the system may also be exposed to changing environmental temperatures, the thermal stresses explained may in particular occur in valves 45, 46 or ejectors 15 that are used in such a system 33. Therefore, the control device 79, as part of the valve and/or ejector system 75, is configured to control the drives 23 of the ejector 15 or the valves 45 and 46 to perform the explained method for positioning the closure elements 11 and to be able to compensate any thermal stresses. The use of valve and/or ejector systems 75 may thus in particular be provided in a refrigeration or heating system 33, wherein in particular at least one valve 45 or 46 or an ejector 15 as well as a control device 79 may be provided in such a valve and/or ejector system 75 to be able to position the respective closure element 11 in accordance with the method explained here. Furthermore, such a refrigeration system may also be used in refrigeration equipment, for example a refrigerator. The valves 45 and 46 and/or the ejector 15 may further be configured with an elastically deformable compensation element 87 arranged in a force transmission path from a housing 59 to a closure element 11 to also enable a mechanical compensation of thermally induced changes in length of the housing 59.

Finally, various embodiments of the invention are again summarized as follows, with reference being made in parentheses by way of example, but not by way of limitation, to elements mentioned above:

Embodiment 1

A method for positioning a closure element (11) of a valve (13) or ejector (15), said closure element (11) being movable by means of a drive (23) between a first end position (G) and a second end position (O), wherein the closure element (11) blocks a throughflow opening (17) of the valve (13) or ejector (15) in the first end position (G) against a throughflow of fluid or gas and releases the throughflow opening (17) in the second end position (O) for a throughflow of fluid or gas,
in which:
the closure element (11) is moved into one of the first end position (G) and the second end position (O), and
a compensation cycle (R) is performed after the closure element (11) has been moved into the one end position (G, O),
wherein the closure element (11) is triggered during the compensation cycle (R) to perform a first compensation movement (R1) towards the other end position (O, G) and to perform a second compensation movement (R2) towards the one end position (G, O).

Embodiment 2

A method according to embodiment 1,
wherein the closure element is movable in a translatory manner between the first end position (G) and the second end position (O).

Embodiment 3

A method according to embodiment 1 or 2,
wherein the closure element (11) is first triggered to perform the first compensation movement (R1) and is then triggered to perform the second compensation movement (R2), or vice versa.

Embodiment 4

A method according to any one of the preceding embodiments,
wherein the closure element (11) is triggered to perform the first compensation movement (R1) along a first distance (W1) and to perform the second compensation movement (R2) along a second distance (W2), wherein the second distance (W2) is greater than the first distance (W1).

Embodiment 5

A method according to any one of the preceding embodiments,
wherein the closure element (11) is movable in a stepwise manner and wherein the closure element (11) is controlled to perform the first compensation movement (R1) with a first number of steps (S1) and to perform the second compensation movement (R2) with a second number of steps (S2), wherein the second number of steps (S2) is greater than the first number of steps (S1).

Embodiment 6

A method according to embodiment 5, wherein the second number of steps (S2) is greater than the first number of steps (S1) by exactly one step.

Embodiment 7

A method according to any one of the preceding embodiments, wherein the closure element (11) is triggered to move by less than 50 micrometers, in particular by less than 20 micrometers, towards the other end position (O, G) in order to perform the first compensation movement (R1).

Embodiment 8

A method according to any one of the preceding embodiments, wherein the triggered first compensation movement (R1) is compensated by an elastic deformation of an elastically deformable compensation element (87) that is arranged in a force transmission path from a housing (59) of the valve (13) or the ejector (15) to the closure element (11).

Embodiment 9

A method according to any one of the preceding embodiments, wherein the compensation cycle (R) is performed after a predefined or predefinable waiting time ($\Delta T$) after the reaching of the one end position (G, O).

Embodiment 10

A method according to embodiment 9, wherein the waiting time ($\Delta T$) is less than 120 seconds, in particular less than 60 seconds and/or less than 30 seconds; and/or wherein the waiting time ($\Delta T$) is approximately 10 seconds.

Embodiment 11

A method according to any one of the preceding embodiments, wherein the closure element (11) is moved into the first end position (G), and wherein the compensation cycle (R) is performed after the closure element (11) has been moved into the first end position (G).

Embodiment 12

A method according to embodiment 11, wherein the throughflow of the fluid or gas through the throughflow opening (17) may be blocked by positioning the closure element (11) within a blocking section (85) of the valve (13) or ejector (15), said blocking section (85) being bounded by the first end position (G) and a blocking position (B) displaced with respect to the first end position (G) towards the second end position (O), wherein the closure element (11) is moved only within the blocking section (85) by performing the first compensation movement (R1) towards the second end position (O).

Embodiment 13

A method according to embodiment 11 or 12, wherein the throughflow opening (17) is closed with a first closing force (O1) by the movement of the first closure element (11) into the first end position (G).

Embodiment 14

A method according to embodiment 13, wherein the first closing force (C1) corresponds to a force that may be transmitted to the closure element (11) by the drive (23).

Embodiment 15

A method according to embodiment 13 or 14, wherein the throughflow opening (17) is closed with a second closing force (C2) by the execution of the second compensation movement (R2), wherein the second closing force (C2) is smaller than the first closing force (O1).

Embodiment 16

A method according to any one of the preceding embodiments, wherein the drive (23) is controlled to drive the closure element (11) with a smaller force during the second compensation movement (R2) than during the movement into the one end position (G, O).

Embodiment 17

A method according to any one of the preceding embodiments, wherein the force that may be transmitted to the closure element (11) by the drive (23) may be set, in particular by setting a motor current (M1, M2, M3) of a motor (25) of the drive (23).

Embodiment 18

A method according to any one of the preceding embodiments, wherein the force transmitted to the closure element (11) by the drive (23) during the movement into the one end position (G, O) is reduced before an expected reaching of the one end position (G, O).

Embodiment 19

A method according to any one of the preceding embodiments, wherein the drive is controlled to drive the closure element (11) with a larger force during the first compensation movement (R1) than during the second compensation movement (R2) and/or than during the movement into the one end position (G, O).

Embodiment 20

A method according to any one of the preceding embodiments,
wherein the compensation cycle (R) is cyclically repeated.

Embodiment 21

A method according to embodiment 20,
wherein a cycle time (ATI) between two consecutive executions of the compensation cycle (R) is constant or increases successively.

Embodiment 22

A method according to embodiment 20 or 21,
wherein the cyclic repetition of the compensation cycle (R) is terminated after a predefined or predefinable maximum number of consecutive compensation cycles (R) has been performed.

Embodiment 23

A valve (13) or ejector (15)
comprising
a closure element (11) that is movable between a first end position
(G) and a second end position (O) and that is configured to block a throughflow opening (17) of the valve (13) or ejector (15) in the first end position (G) against a throughflow of fluid or gas and to release the throughflow opening (17) in the second end position (O) for a throughflow of fluid or gas; and
an elastically deformable compensation element (87),
wherein the elastically deformable compensation element (87) is arranged in a force transmission path from a housing (59) of the valve (13) or ejector (15) to the closure element (11).

Embodiment 24

A valve (13) or ejector (15) according to embodiment 23,
wherein the closure element (15) is supported at the housing (59) via the compensation element (87).

Embodiment 25

A valve (13) or ejector (15) according to embodiment 23 or 24,
wherein the closure element is movable in a translatory manner between the first end position (G) and the second end position (O).

Embodiment 26

A valve (13) or ejector (15) according to any one of the embodiments 23 to 25,
wherein the closure element (11) is preloaded towards the first end position (G) via the compensation element (87).

Embodiment 27

A valve (13) or ejector (15) according to any one of the embodiments 23 to 26,
wherein the compensation element (87) is configured to be elastically deformed as a result of a movement of the closure element (11) into the first end position (G).

Embodiment 28

A valve (13) or ejector (15) according to any one of the embodiments 23 to 27,
wherein the compensation element (87) may be elastically deformed by a force exerted on the closure element (11) and directed towards the second end position (O) when the closure element (11) is positioned in the first end position (G).

Embodiment 29

A valve (13) or ejector (15) according to any one of the embodiments 23 to 28,
wherein the compensation element (87) is arranged at the closure element (11) or at a connection section that is movable in a translatory manner together with the closure element (11).

Embodiment 30

A valve (13) or ejector (15) according to any one of the embodiments 23 to 29,
further comprising a spindle drive (101) for driving the closure element (15), said spindle drive (101) having a spindle nut (93) or spindle (27) that may be driven to make a rotational movement,
wherein the spindle nut (93) or spindle (27) is supported at the housing (59), in particular via a bearing (95), by the compensation element (87).

Embodiment 31

A valve (13) or ejector (15) according to embodiment 30,
wherein the spindle nut (93) or spindle (27) is preloaded towards the first end position (G), in particular via a bearing (95), by the compensation element (87).

Embodiment 32

A valve (13) or ejector (15) according to embodiment 30 or 31,
wherein the spindle nut (93) or spindle (27) and a drive shaft (99) are rigidly connected to one another and the drive shaft (99) is axially movable relative to an associated drive (23); or
wherein the spindle nut (93) or spindle (27) and a drive shaft (99) are connected fixed for rotation with one another, but axially displaceably relative to one another.

Embodiment 33

A valve (13) or ejector (15) according to any one of the embodiments 23 to 32,
wherein the compensation element (87) is configured as a spring (89), in particular a plate spring.

Embodiment 34

A valve and/or ejector system (75),
comprising:
at least one valve (13) and/or at least one ejector (15);

a closure element (11) that is movable between a first end position (G) and a second end position (O) and that is configured to block a throughflow opening (17) of the valve (13) or ejector (15) in the first end position (G) against a throughflow of fluid or gas and to release the throughflow opening (17) in the second end position (O) for a throughflow of fluid or gas;

a drive (23) for moving the closure element (11); and a control device (79) that is configured to position the closure element (11) in accordance with a method according to any one of the embodiments 1 to 22.

Embodiment 35

A valve and/or ejector system (75) according to embodiment 34, wherein the drive (23) comprises a stepper motor (25).

Embodiment 36

A valve and/or ejector system (75) according to embodiment 34 or 35, wherein the closure element (11) is configured as a valve needle (31).

Embodiment 37

A valve and/or ejector system (75) according to any one of the embodiments 34 to 36, wherein the at least one valve (13) and/or the at least one ejector (15) is/are configured in accordance with any one of the embodiments 23 to 33.

Embodiment 38

A refrigeration system (33), a heating system (33) or refrigeration equipment comprising a valve and/or ejector system (75) according to any one of the embodiments 34 to 37 and/or a valve (13) and/or an ejector (15) according to any one of the embodiments 23 to 33.

Embodiment 39

Use of a valve and/or ejector system (75) according to any one of the embodiments 34 to 37 and/or a valve (13) and/or an ejector (15) according to any one of the embodiments 23 to 33 in a refrigeration system (33), in a heating system (33) or in refrigeration equipment.

What is claimed is:

1. A method for positioning a closure element of a valve or ejector, said closure element being movable by means of a drive between a first end position and a second end position, wherein the closure element blocks a throughflow opening of the valve or ejector in the first end position against a throughflow of fluid or gas and releases the throughflow opening in the second end position for a throughflow of fluid or gas, the method comprising:

moving the closure element into one end position of the first end position or the second end position, and performing a compensation cycle after the closure element has been moved into the one end position, triggering the closure element during the compensation cycle to perform a first compensation movement towards the other end position and to perform a second compensation movement towards the one end position, wherein the closure element is triggered to perform the first compensation movement along a first distance and to perform the second compensation movement along a second distance, wherein the second distance is greater than the first distance, and wherein the compensation cycle is cyclically repeated.

2. The method according to claim 1, wherein the closure element is first triggered to perform the first compensation movement and is then triggered to perform the second compensation movement after the first compensation movement.

3. The method according to claim 1, wherein the closure element is movable in a stepwise manner, wherein the closure element is triggered to perform the first compensation movement with a first number of steps and to perform the second compensation movement with a second number of steps, and wherein the second number of steps is greater than the first number of steps.

4. The method according to claim 1, wherein the first compensation movement that is triggered is compensated by an elastic deformation of an elastically deformable compensation element that is arranged in a force transmission path from a housing of the valve or the ejector to the closure element.

5. The method according to claim 1, wherein the compensation cycle is performed after a predefined waiting time after reaching the one end position.

6. The method according to claim 1, wherein the closure element is moved into the first end position, and wherein the compensation cycle is performed after the closure element has been moved into the first end position.

7. The method according to claim 6, wherein the throughflow of the fluid or gas through the throughflow opening is blockable by positioning the closure element within a blocking section of the valve or ejector, the blocking section being bounded by the first end position and a blocking position displaced with respect to the first end position towards the second end position, and wherein at least a portion of the closure element remains within the blocking section by performing the first compensation movement towards the second end position.

8. The method according to claim 6, wherein the throughflow opening is closed with a first closing force by the movement of the closure element into the first end position, wherein the throughflow opening is closed with a second closing force by the second compensation movement, and wherein the second closing force is smaller than the first closing force.

9. The method according to claim 1, wherein the drive is controlled to perform at least one of:

driving the closure element with a smaller force during the second compensation movement than during the movement into the one end position; or driving the closure element with a larger force during the first compensation movement than during at least one of the second compensation movement or the movement into the one end position.

10. The method according to claim 1, wherein the force transmitted to the closure element by the drive during the movement into the one end position is reduced before an expected reaching of the one end position.

11. The method according to claim 1, wherein a cycle time between two consecutive compensation cycles is constant or increases successively.

12. A valve system or ejector system, comprising:

at least one of: at least one valve or at least one ejector;

a closure element of the at least one valve of the at least one ejector that is movable between a first end position and a second end position and that is configured to block a throughflow opening of the at least one valve or the at least one ejector in the first end position against a throughflow of fluid or gas and to release the throughflow opening in the second end position for a throughflow of fluid or gas;

a drive for moving the closure element; and a control device that is configured to position the closure element in accordance with the method according to claim 1.

13. The valve system or ejector system according to claim 12, the at least one valve or the at least one ejector comprising:

an elastically deformable compensation element, wherein the elastically deformable compensation element is arranged in a force transmission path from a housing of the valve or ejector to the closure element.

14. The valve system or ejector system according to claim 13, wherein the compensation element is configured to be elastically deformable by at least one of a movement of the closure element into the first end position; or a force exerted on the closure element and directed towards the second end position when the closure element is positioned in the first end position.

15. The valve system or ejector system according to claim 13, wherein the compensation element is arranged at the closure element or at a connection section that is movable in a translatory manner together with the closure element.

16. A refrigeration system, a heating system or refrigeration equipment comprising the valve system or ejector system according to claim 12.

17. A refrigeration system, a heating system or refrigeration equipment comprising at least one of the valve system or ejector system according to claim 13.

* * * * *